United States Patent [19]

Krygowski et al.

[11] Patent Number: 4,503,497

[45] Date of Patent: Mar. 5, 1985

[54] SYSTEM FOR INDEPENDENT CACHE-TO-CACHE TRANSFER

[75] Inventors: Matthew A. Krygowski, Hopewell Junction; Benedicto U. Messina, Poughkeepsie; William D. Silkman, Hopewell Junction, all of N.Y.

[73] Assignee: International Business Machines Corporation, Armonk, N.Y.

[21] Appl. No.: 382,842

[22] Filed: May 27, 1982

[51] Int. Cl.³ .................. G06F 13/00; G06F 15/16
[52] U.S. Cl. ................................................ 364/200
[58] Field of Search ............................. 364/200, 900

[56] References Cited

U.S. PATENT DOCUMENTS

| | | | |
|---|---|---|---|
| 3,735,360 | 5/1973 | Anderson et al. | 364/200 |
| 3,806,888 | 4/1974 | Brickman et al. | 364/200 |
| 4,032,899 | 6/1977 | Jenny et al. | 364/200 |
| 4,394,731 | 6/1983 | Flusche et al. | 364/200 |
| 4,410,944 | 10/1983 | Kronies | 364/200 |

Primary Examiner—James D. Thomas
Assistant Examiner—David L. Clark
Attorney, Agent, or Firm—Bernard M. Goldman

[57] ABSTRACT

The disclosure provides a plurality of embodiments for controlling the bus paths for a line of data from any cache in a multiprocessing system (MP) to any requesting cache or I/O channel processor in the MP. The data transfers can occur in parallel among plural CPU caches, channel processors and main storage (MS) sections using crosspoint switches in a manner which utilizes the high circuit count of LSI modules without substantially utilizing the module I/O pin count to enable MP structures to contain more CPUs than could be contained with conventional bussing.

35 Claims, 38 Drawing Figures (MP SYSTEM)

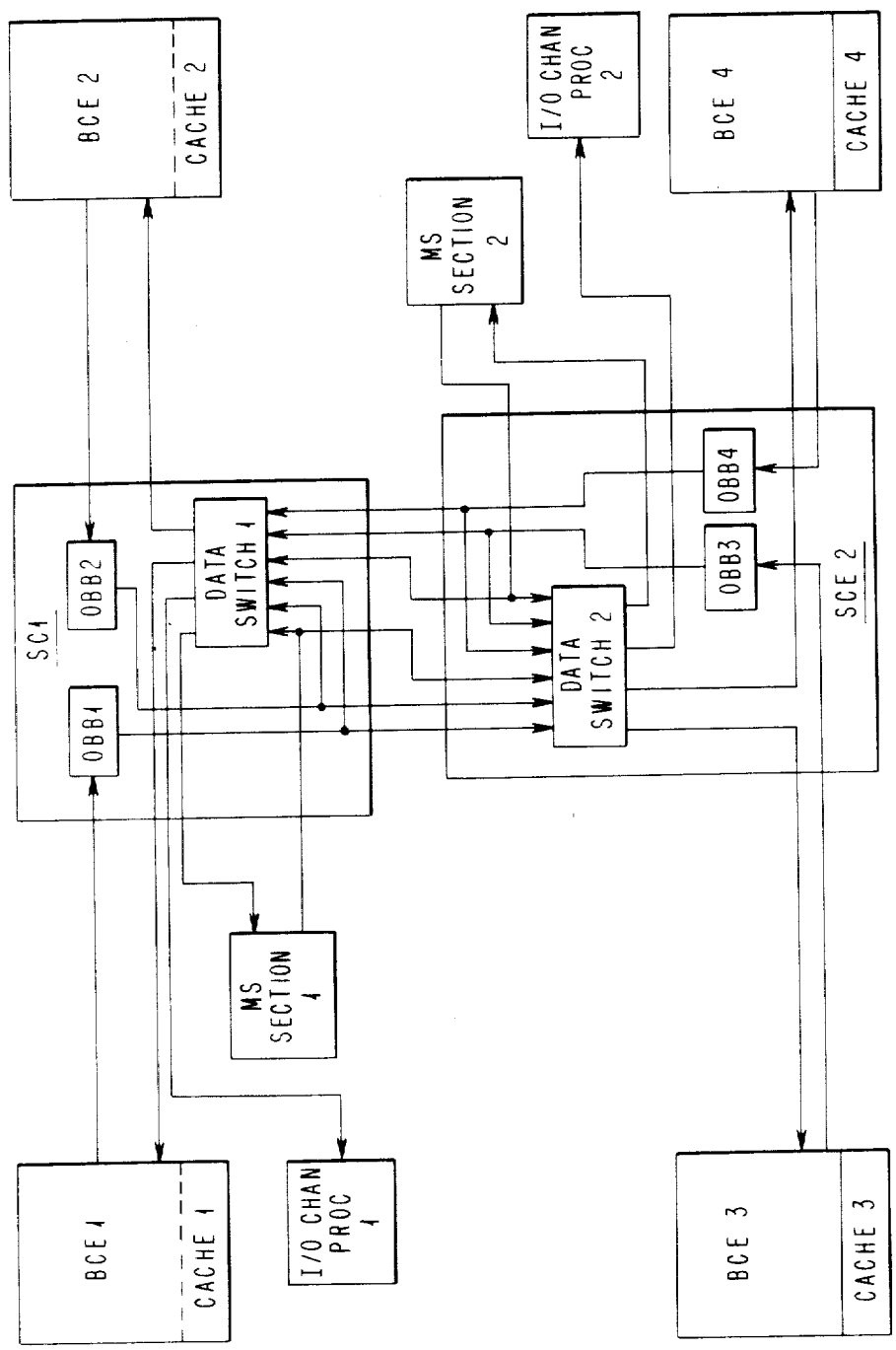
FIG. 2 (DEDICATED DATA BUSSING)

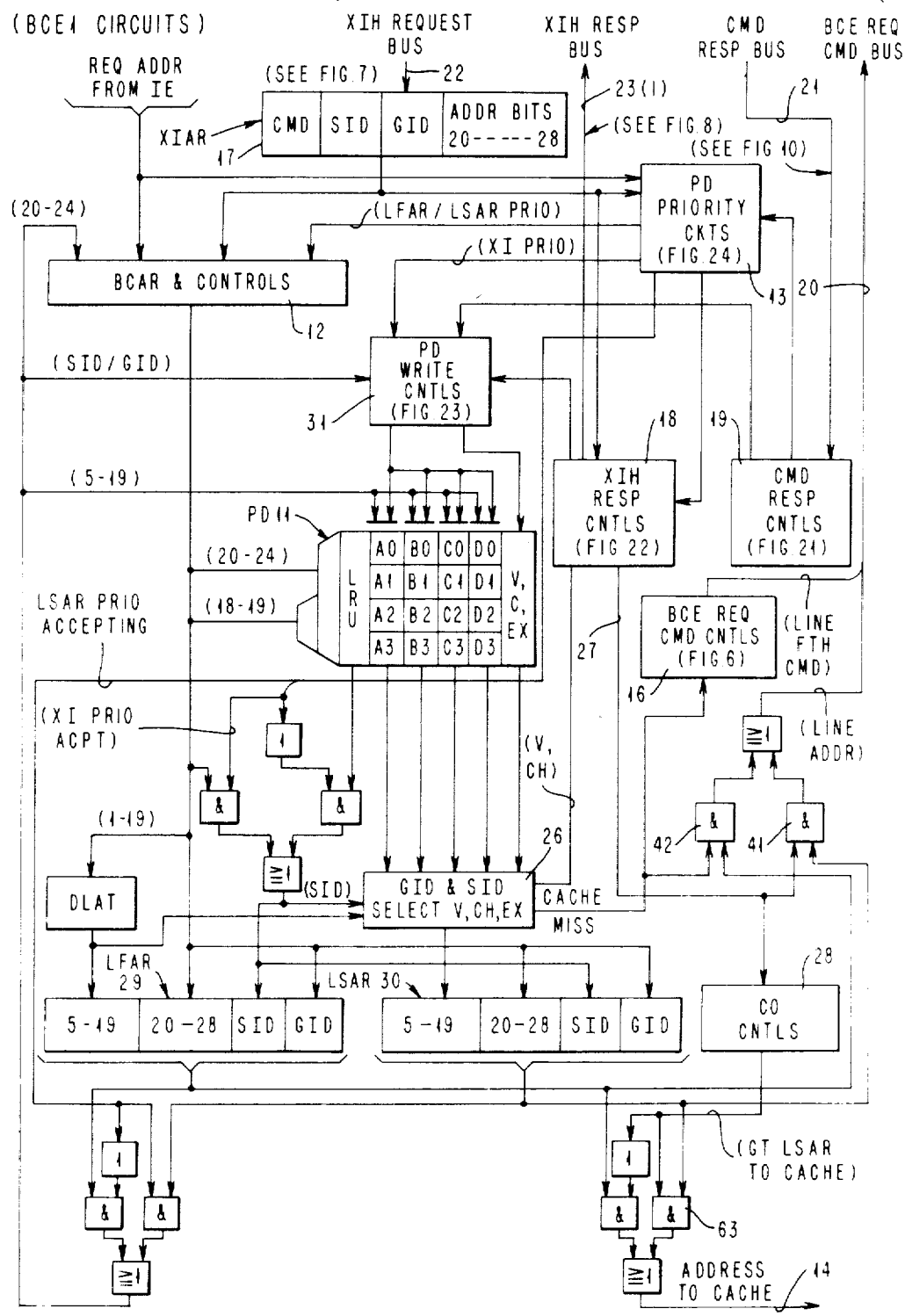
FIG. 4 (BCE1 CIRCUITS)

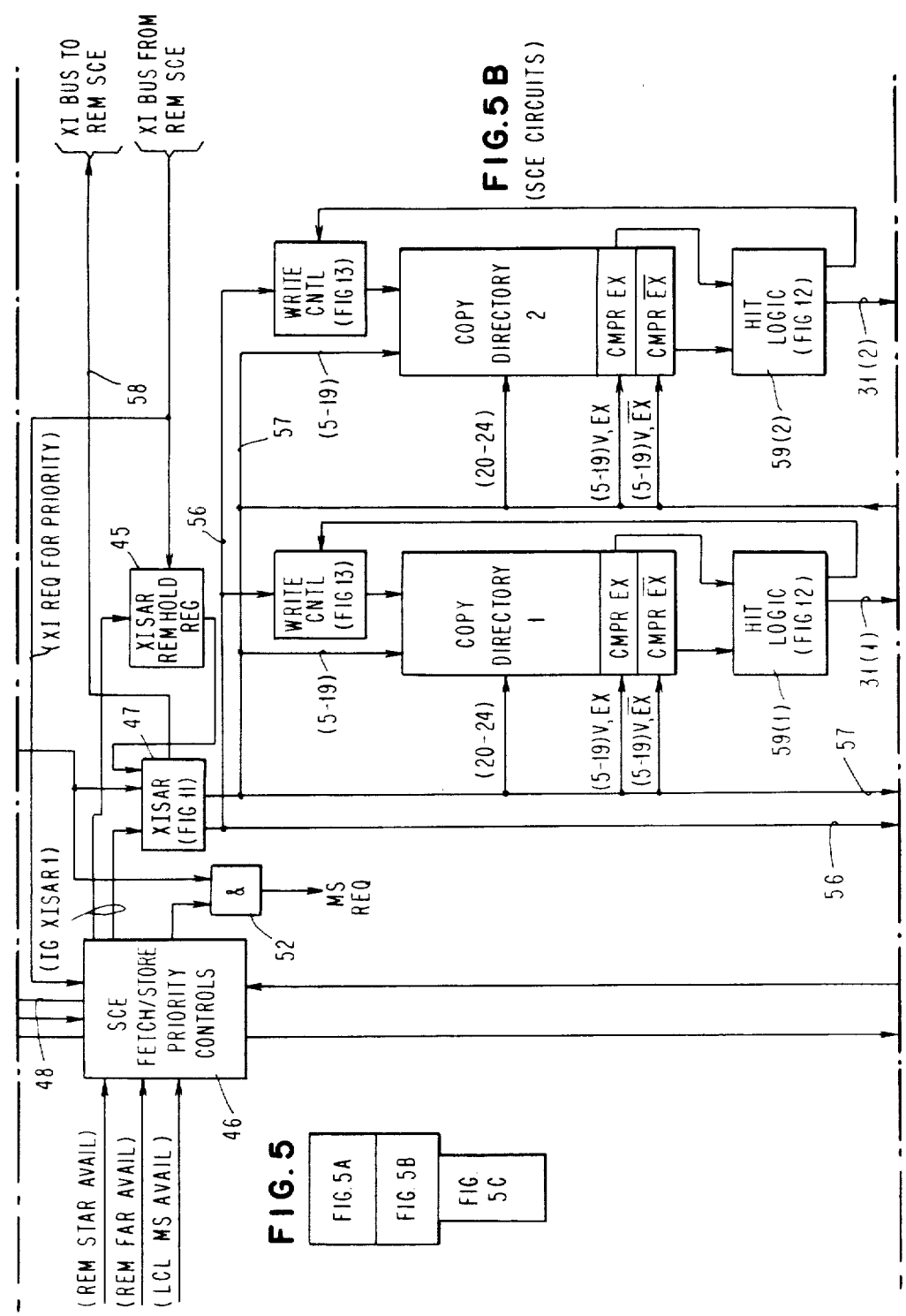

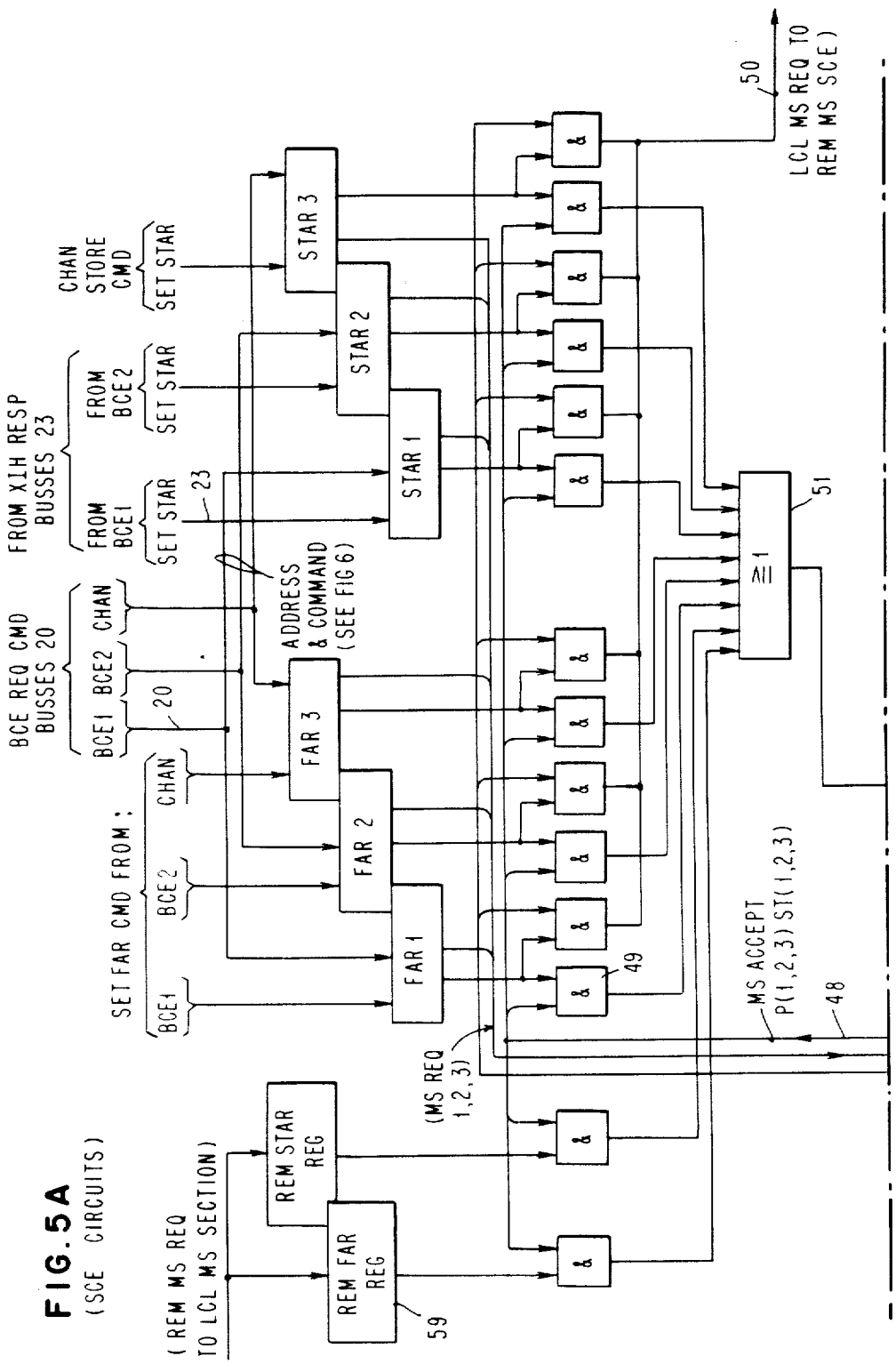

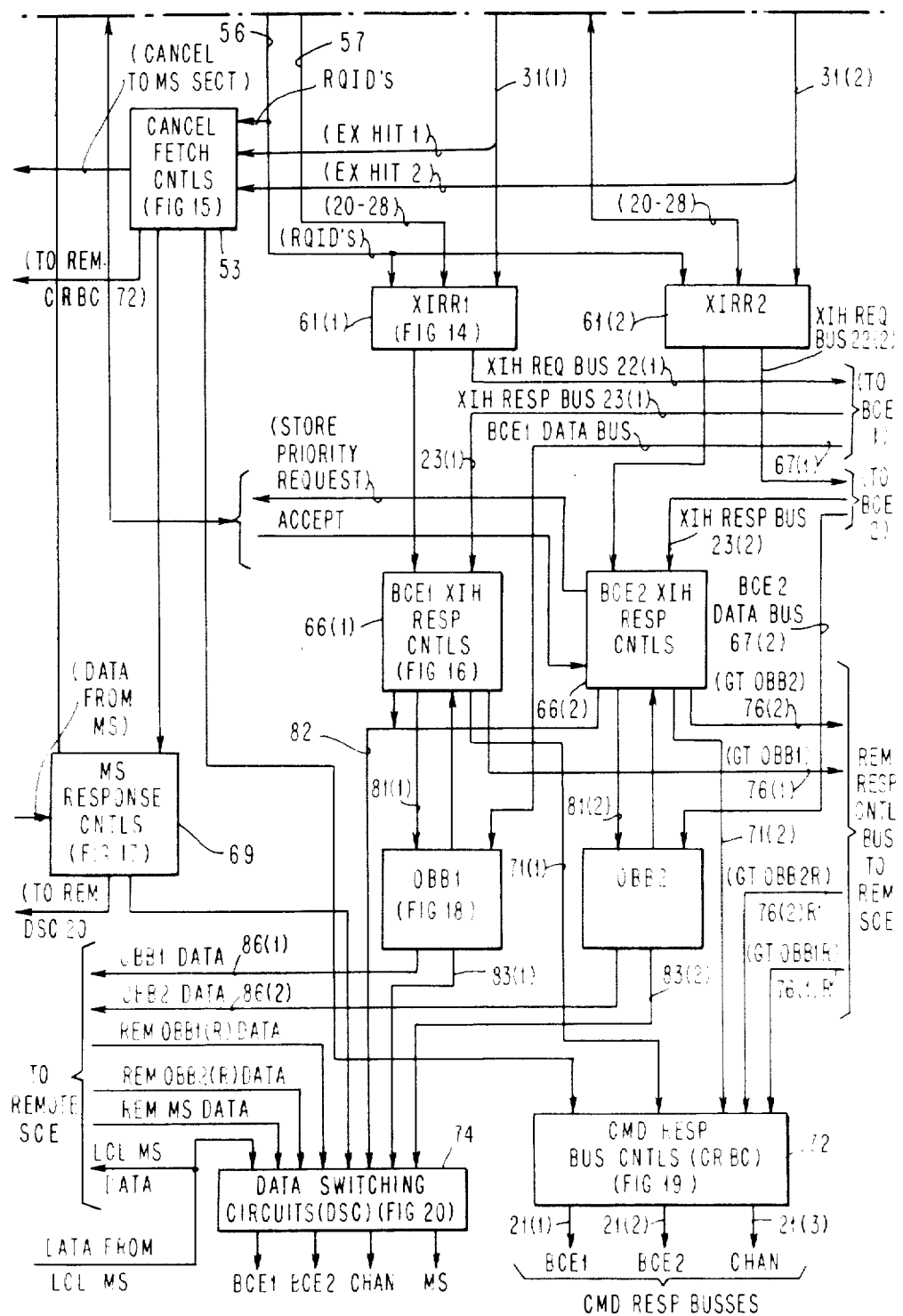
FIG. 5C (SCE CIRCUITS)

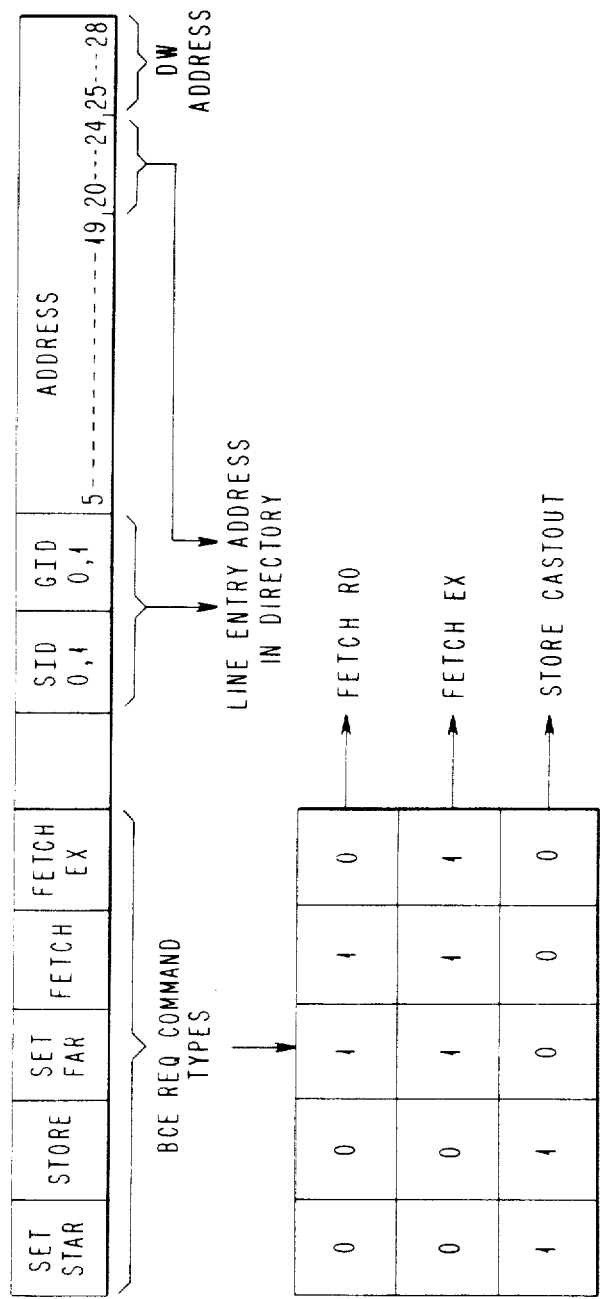

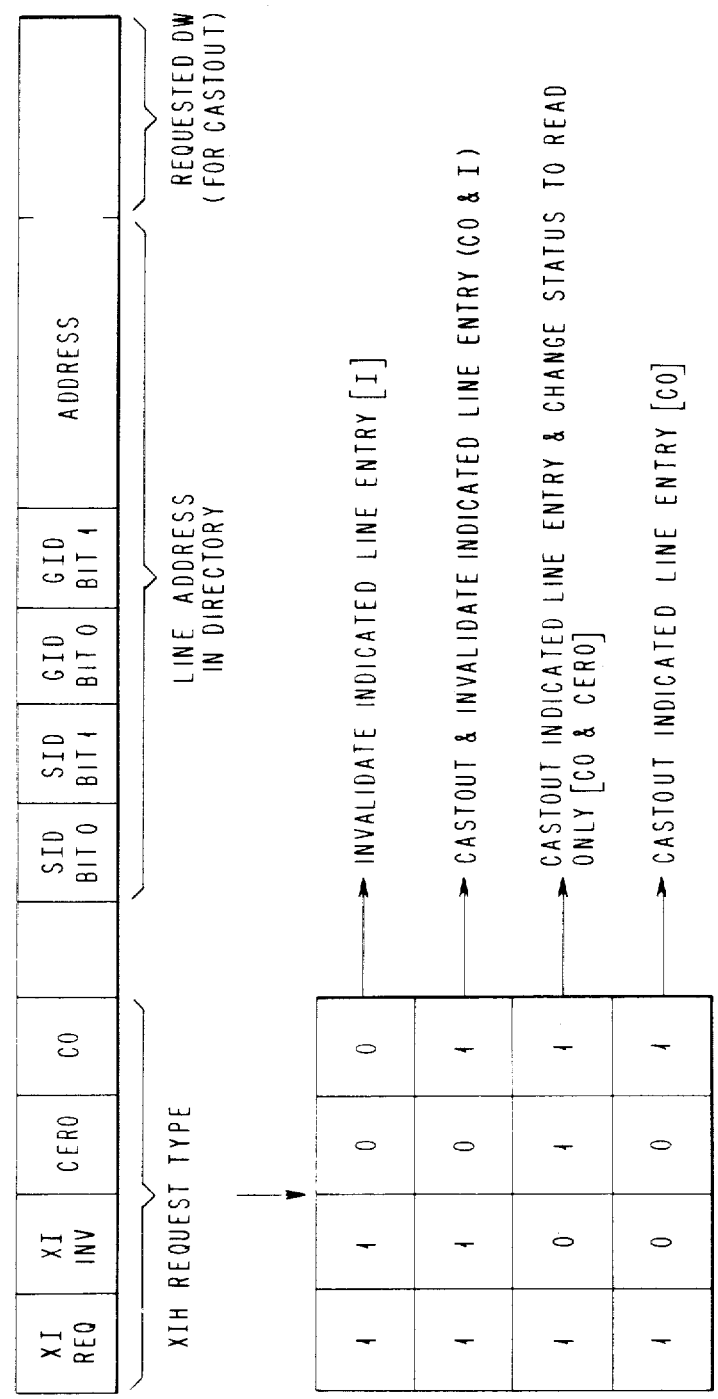

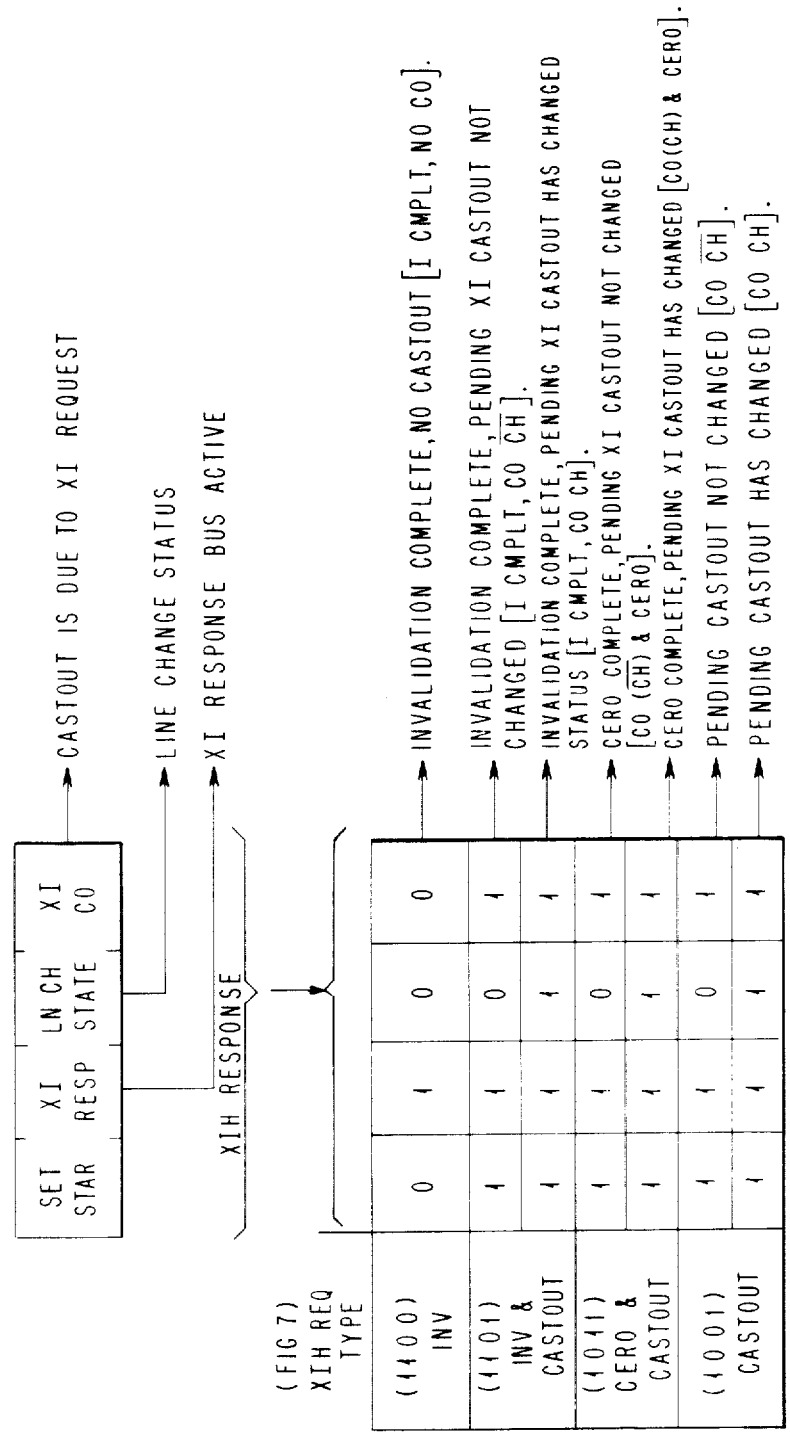
FIG. 8 XIH RESPONSE BUS [PD(XIH) TO SCE]

FIG. 9A
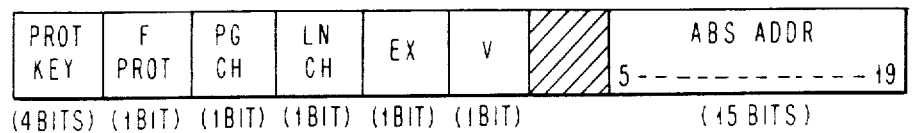
FIG. 9B (CD ENTRY)
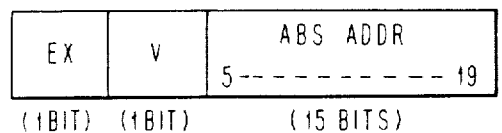
FIG. 10
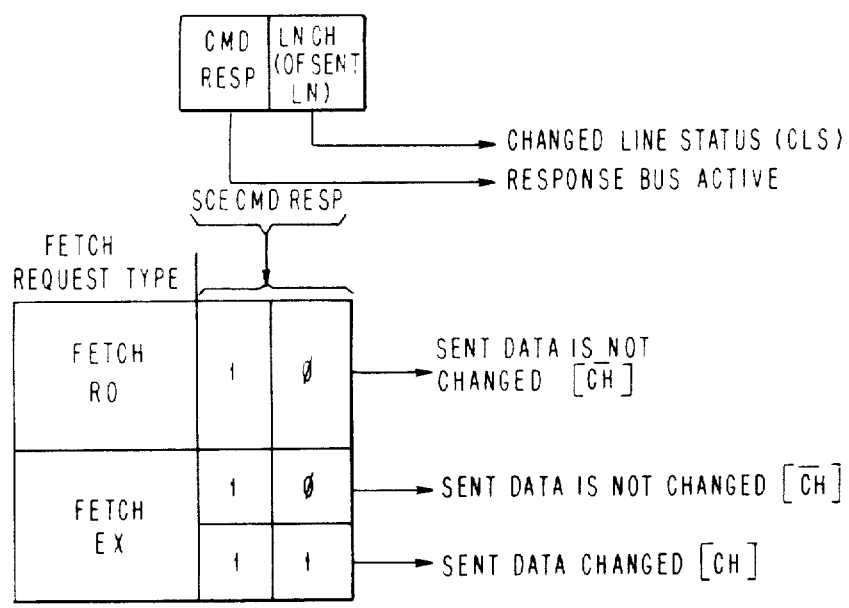

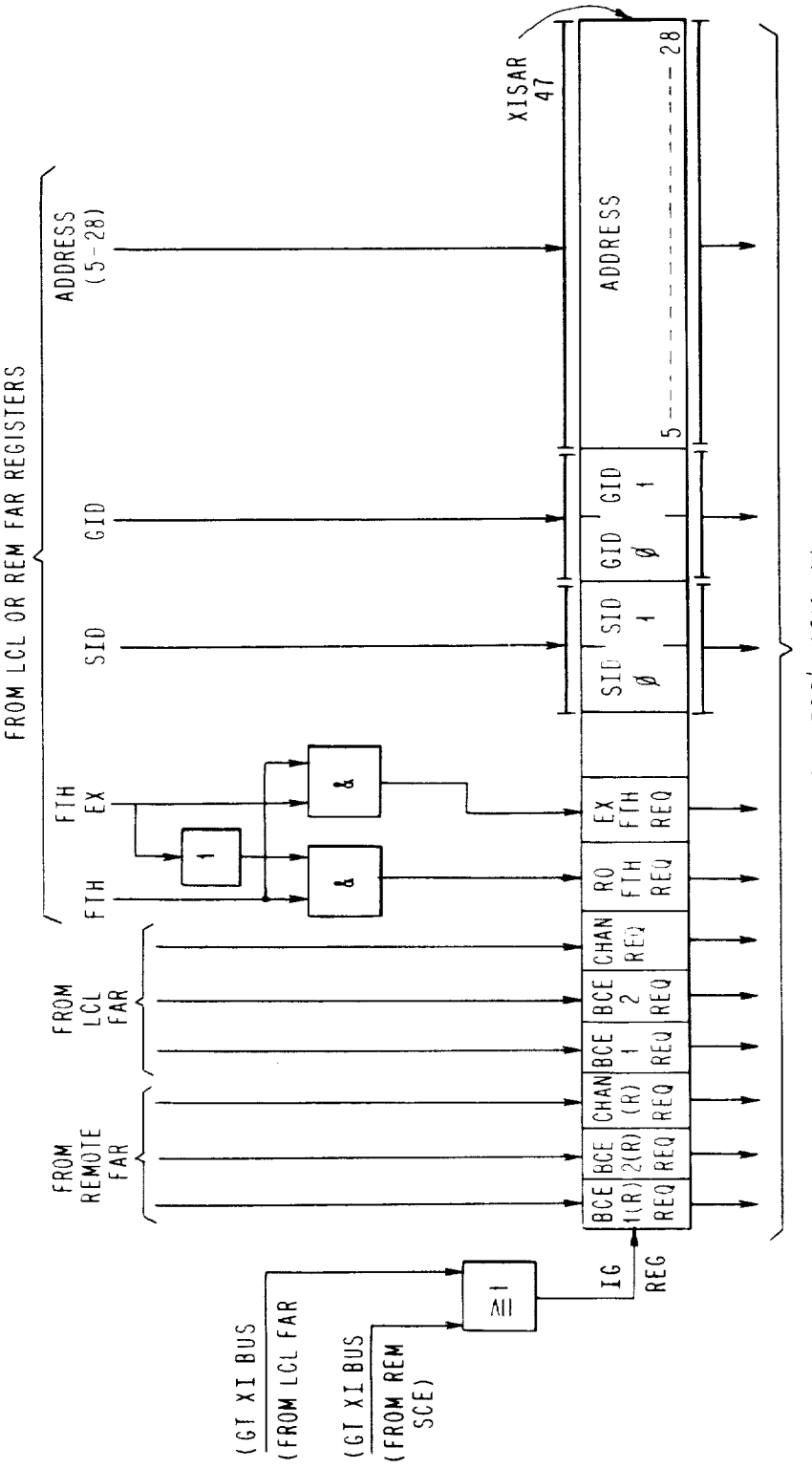
FIG. 11 (XISAR-XI SEARCH ADDRESS REG)

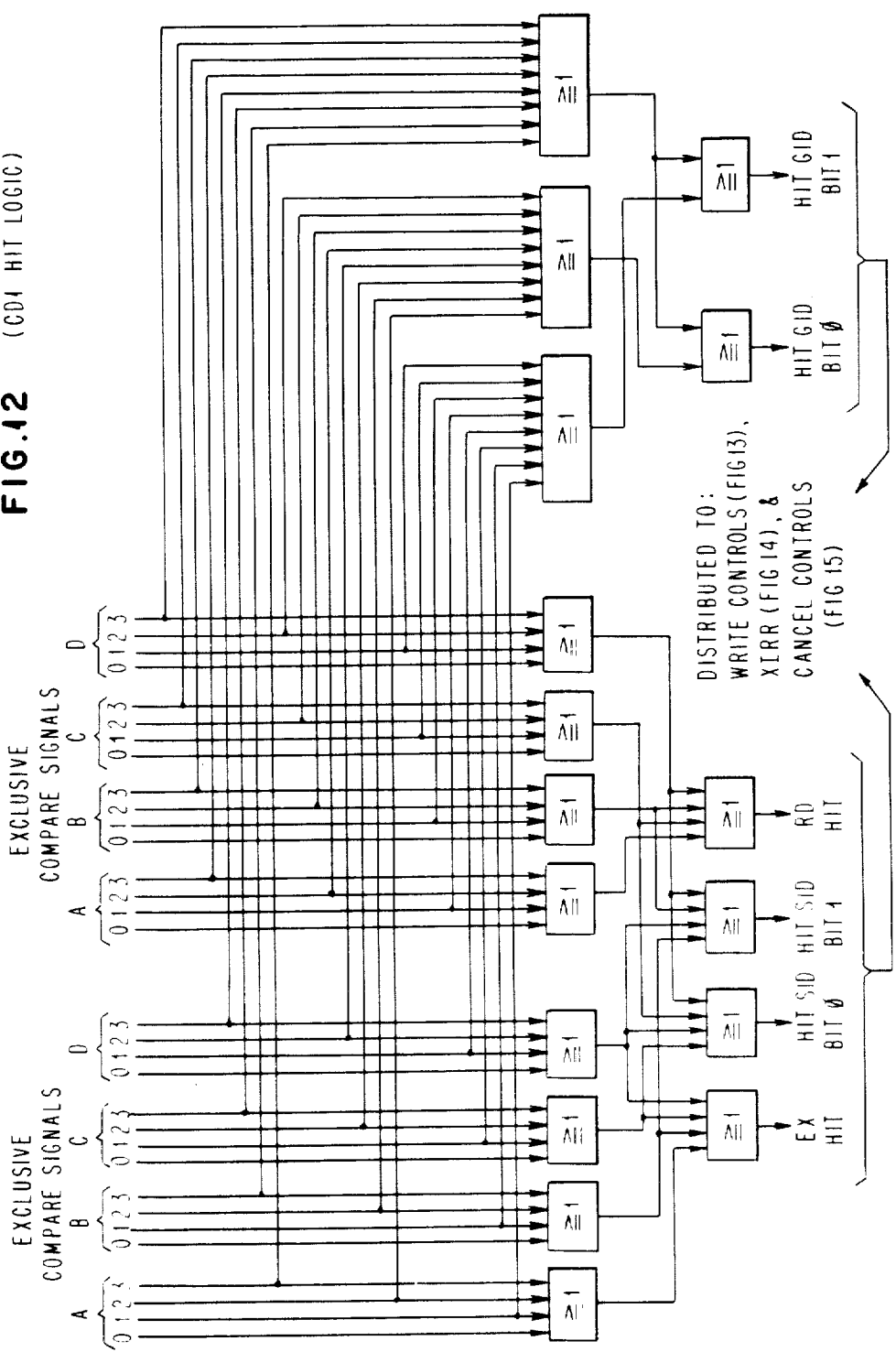

FIG. 13 (SCE CD WRITE CONTROL)
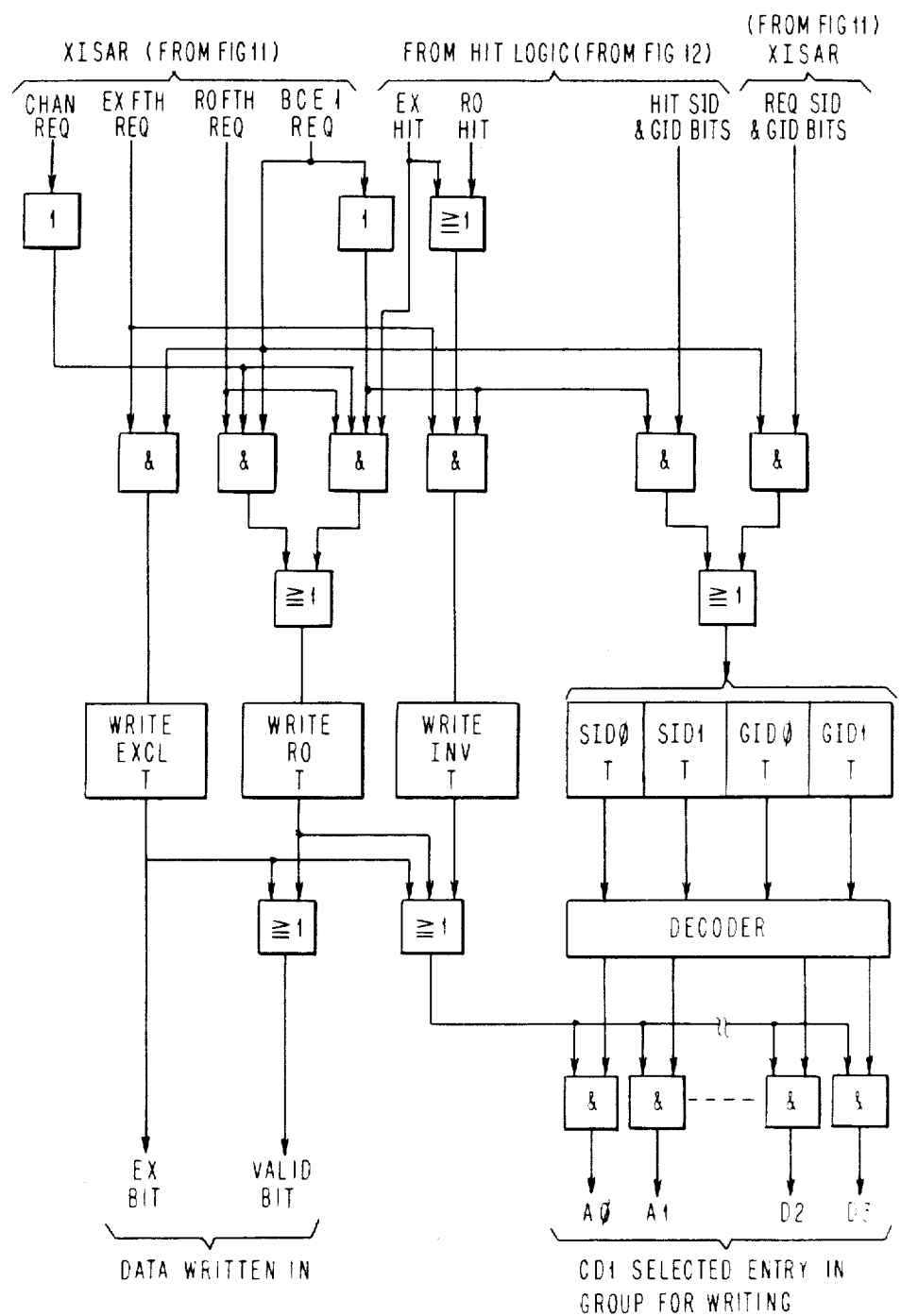

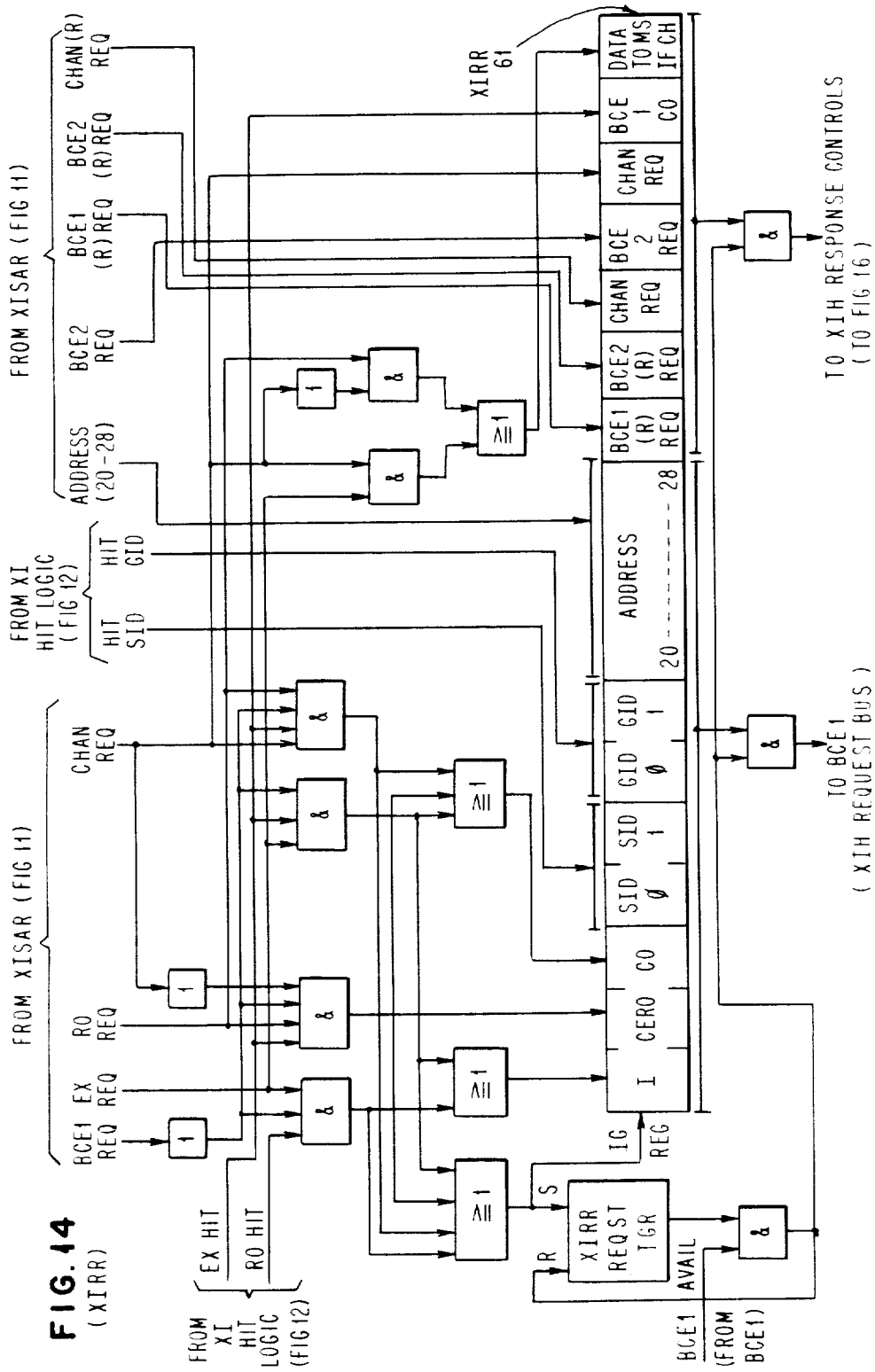

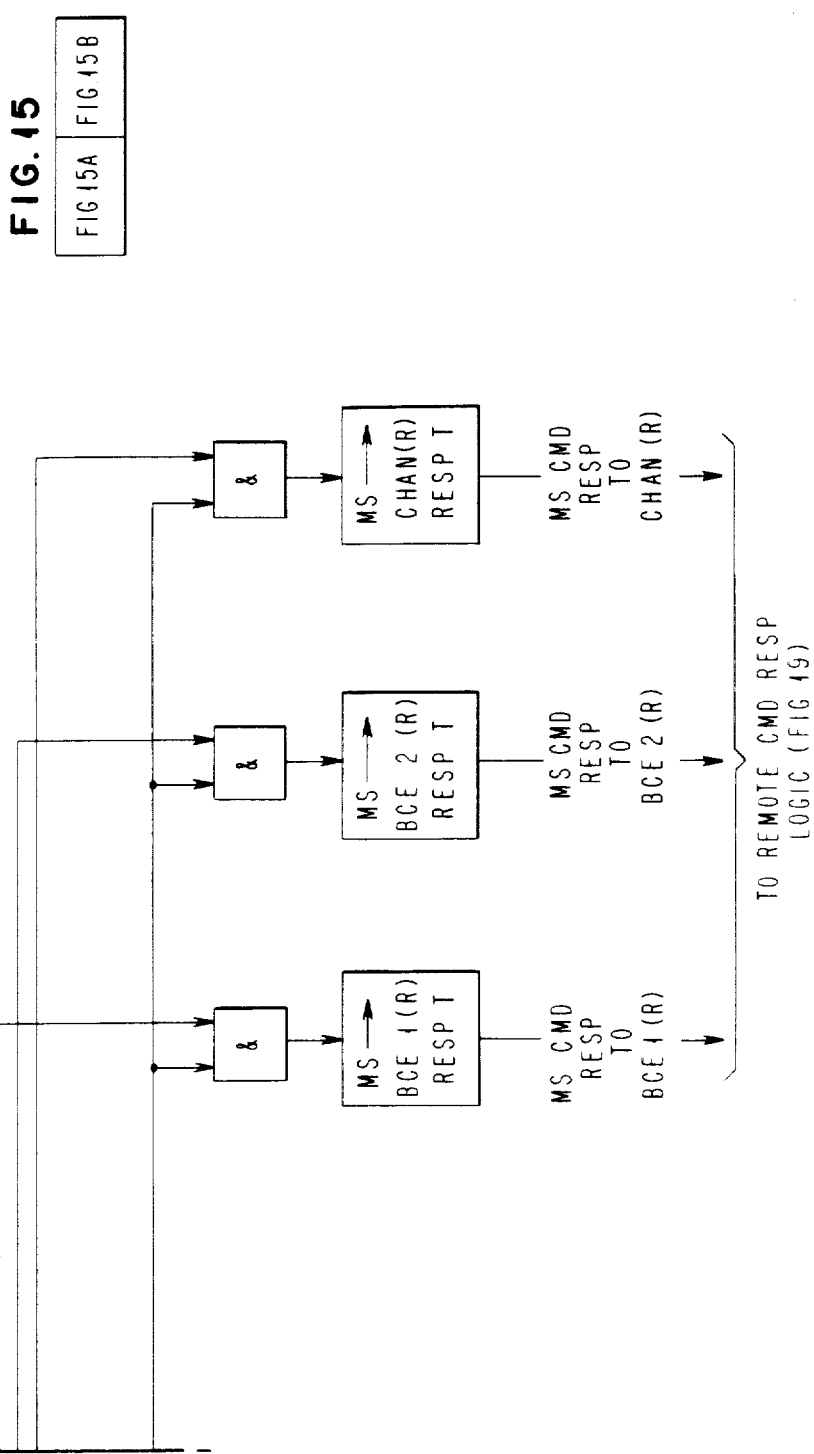

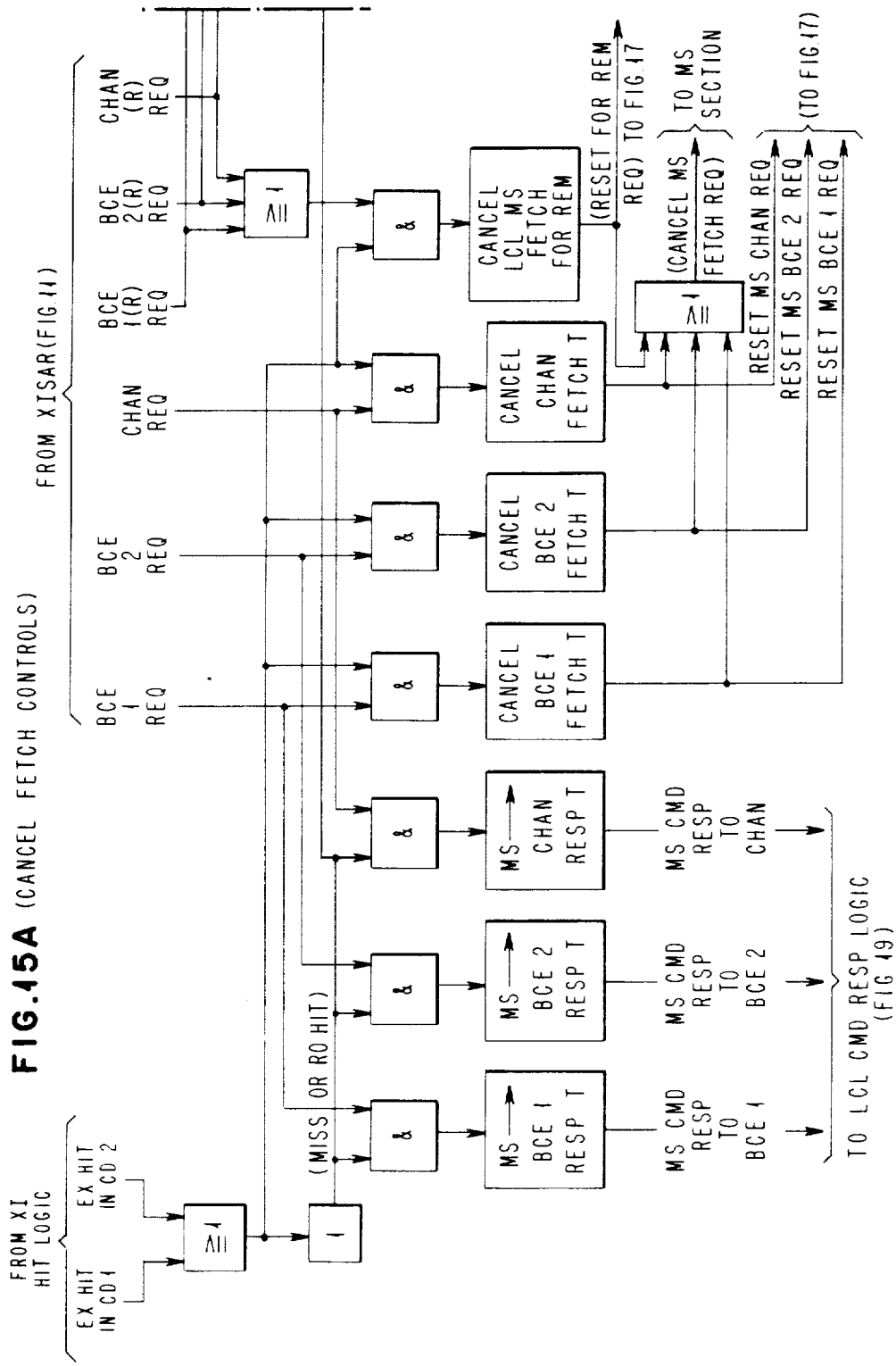

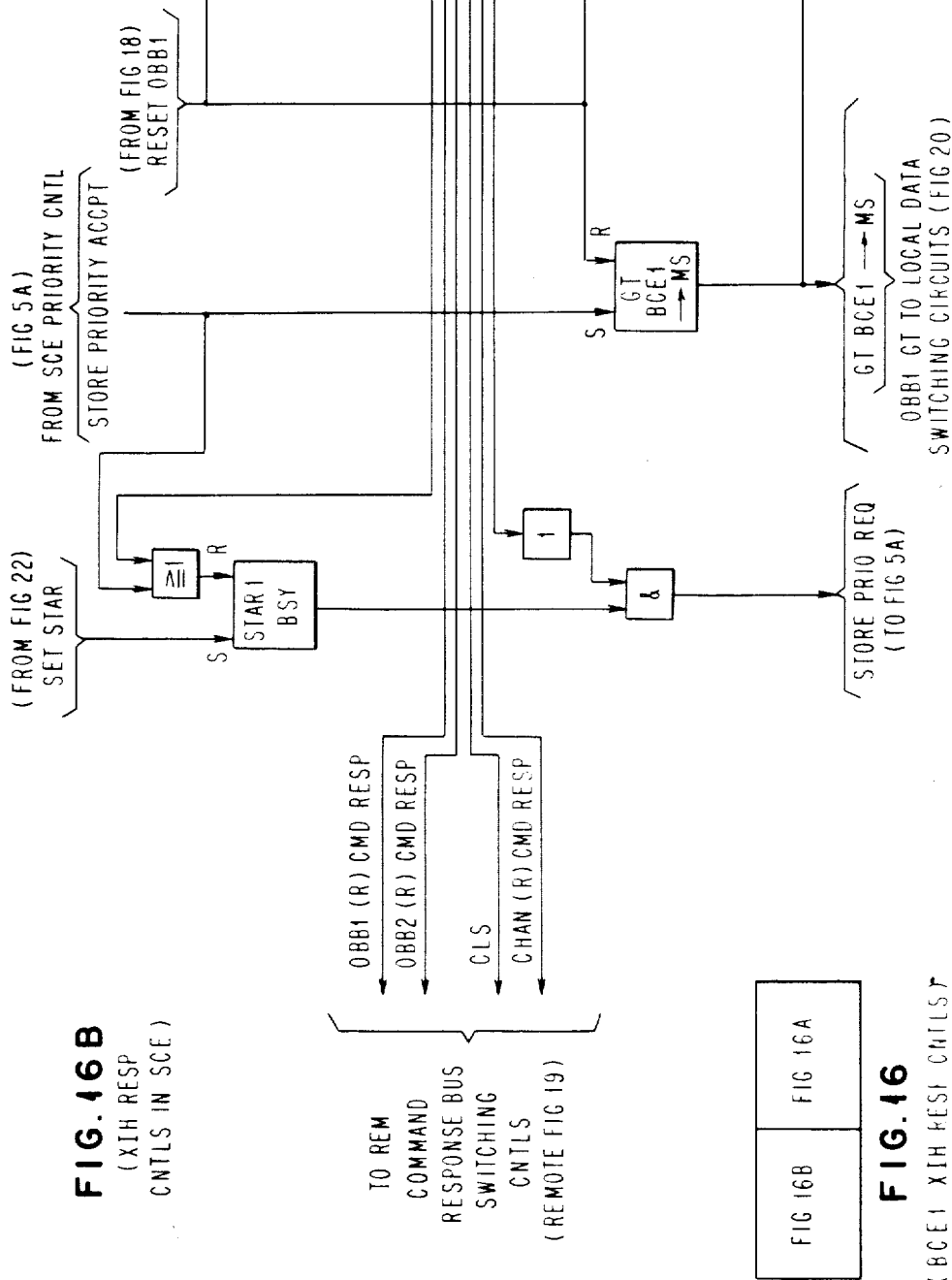

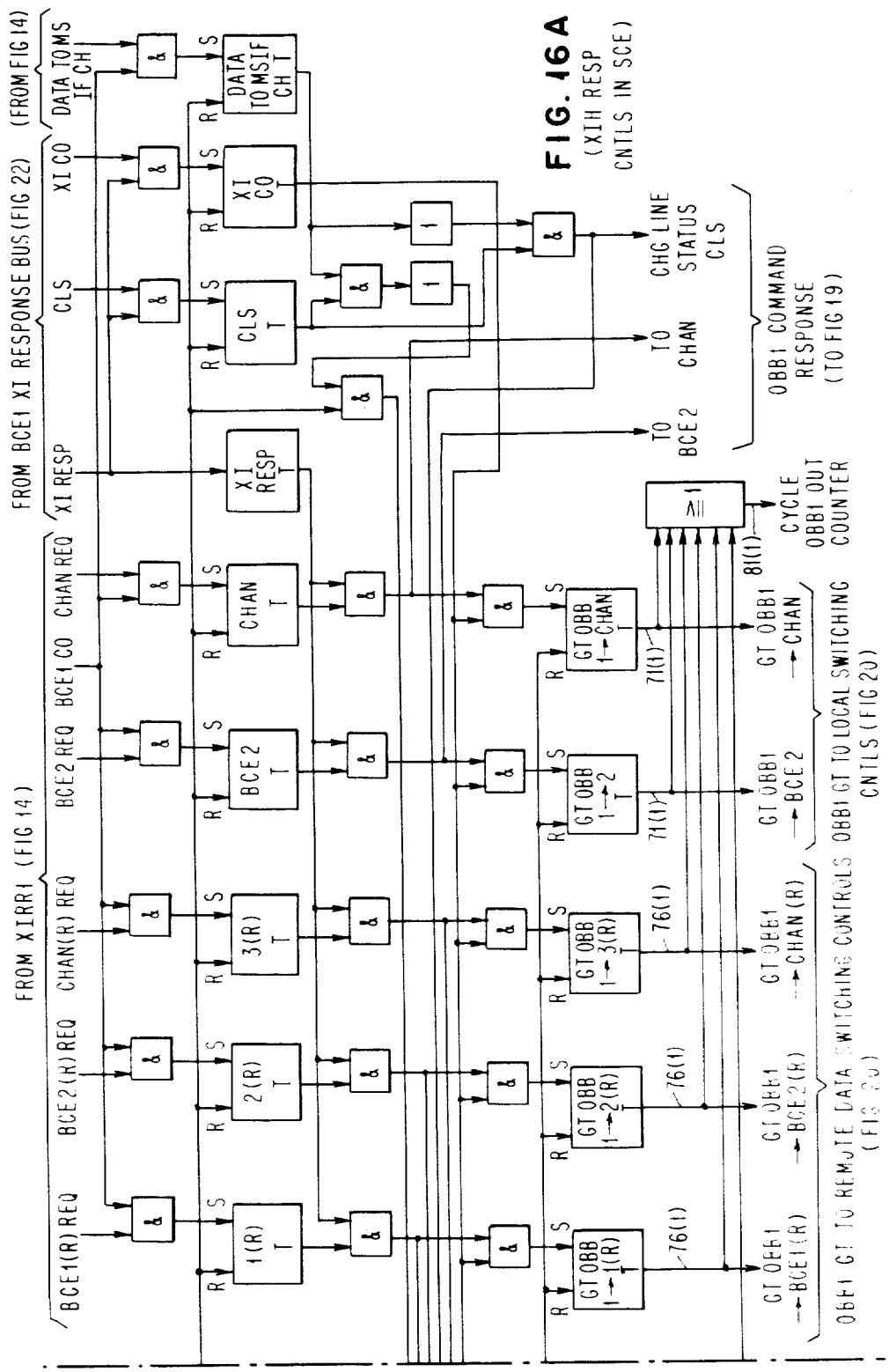

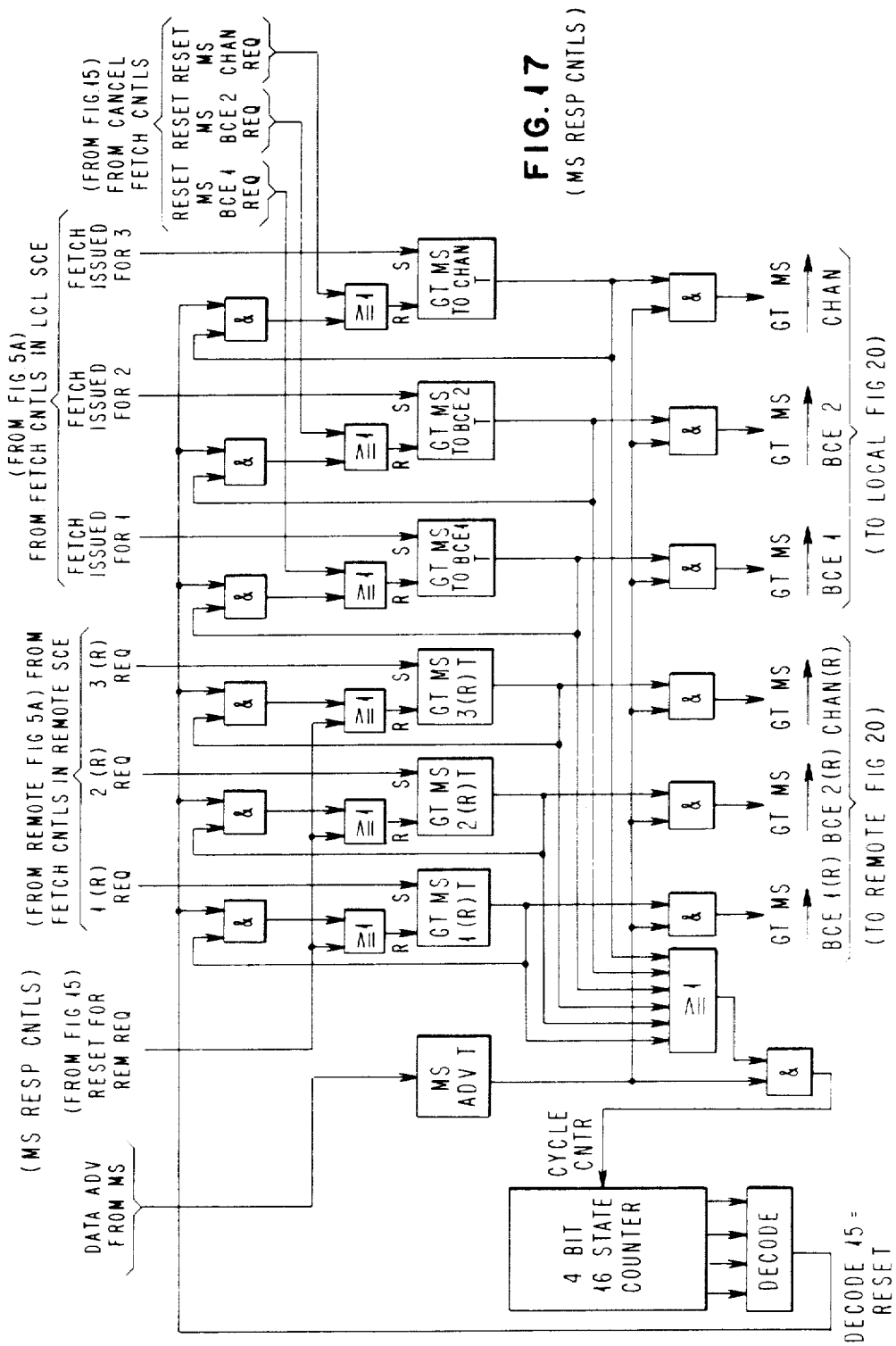
FIG. 17 (MS RESP CNTLS)

(OBB1)

FIG. 24 (BCE 1 CMD RESP CIRCUITS)

(PD PRIORITY CIRCUITS)

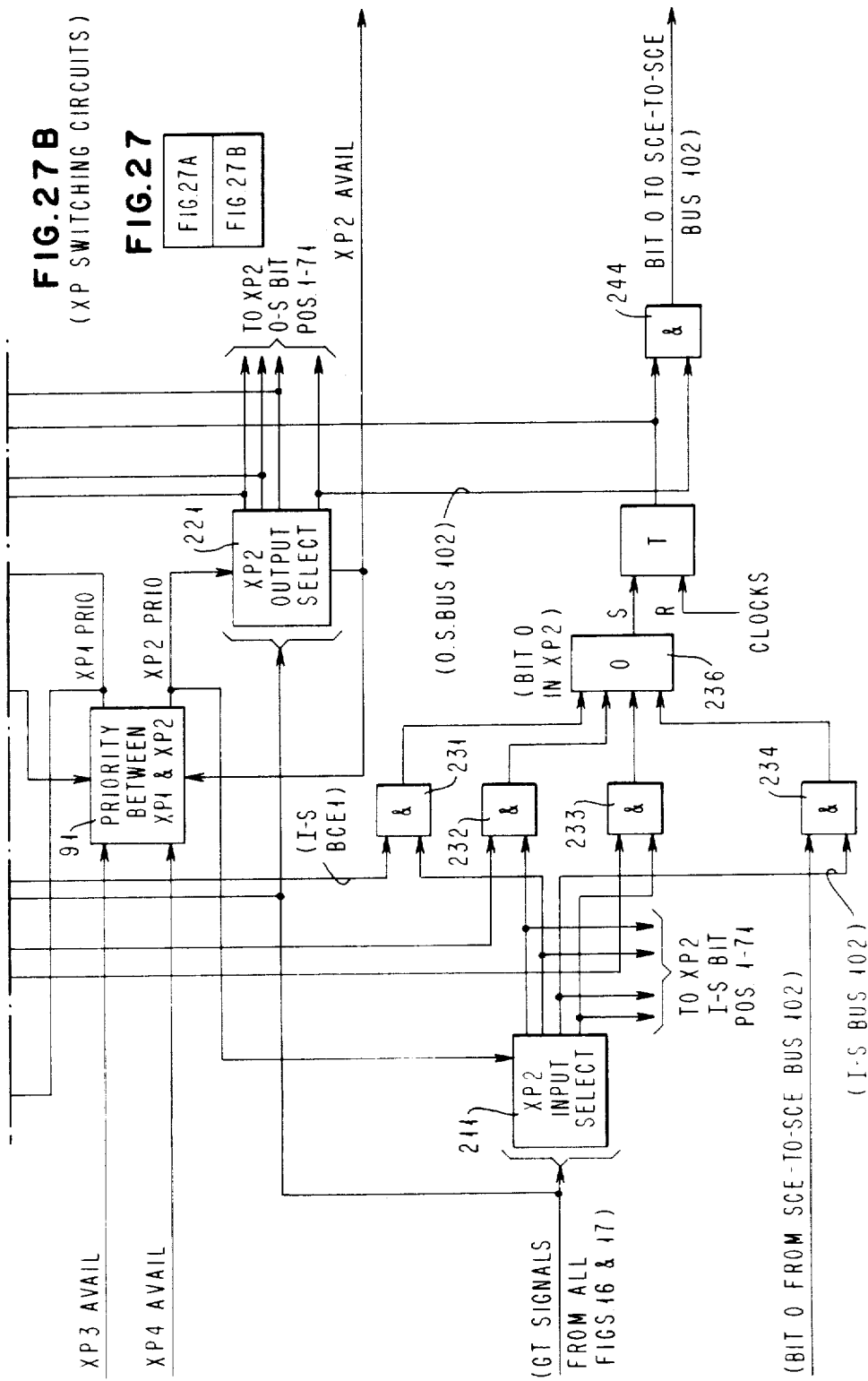

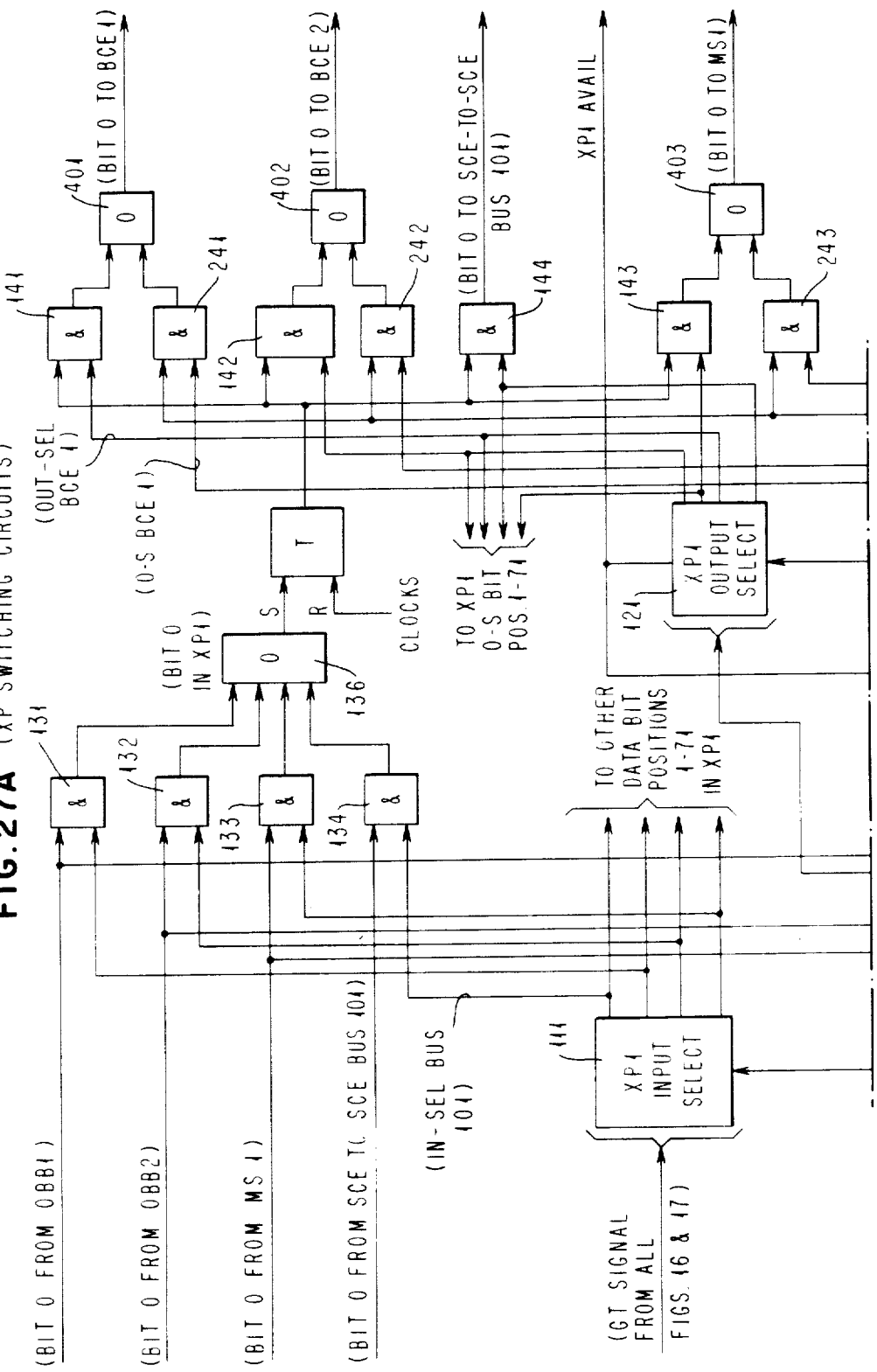
FIG. 27A (XP SWITCHING CIRCUITS)

SYSTEM FOR INDEPENDENT CACHE-TO-CACHE TRANSFER

INTRODUCTION

The subject invention relates to novel cache-to-cache and cache-to-channel data transfer control means and bussing in a multiprocessor (MP) system.

PRIOR ART

Recently the store-in-cache (SIC) has been found to provide better system performance than store-through (ST) caches in large multiprocessor (MP) systems having very large and relatively slow main storage (MS), because the SIC has less bandwidth requirements to main storage than the ST. That is, the MS bussing has become a critical path to system performance because its overloading has a direct affect in decreasing the MP performance below its theoretical maximum. Thus, a processor accessing a SIC does not use the main storage bus when it performs most write or fetch operations, unlike a ST cache processor which writes (but does not fetch) directly in MS. A processor using a SIC will only occasionally write into main storage when cache line castouts occur, which happen either (1) when cache space (needed for a new line) is occupied by a changed line of data (i.e. local castout), or (2) a line of data in the cache is requested by another cache (i.e. cross-interrogate hit castout). The cross-interrogate hit (XIH) castout is caused when a processor cache misses an IE request and then cross-interrogates (XIs) the cache of each other processor in the MP in an effort to find the requested data line in another processor cache in the MP system. In fact with SIC processors, a requested line may only exist in a cache, since the corresponding line of data in MS may not contain changes found in a cache updated version of the line, and hence such line is not available from the shared main storage. In such case, the processor requiring, but not having the line, has no recourse other than to obtain the line from the other processor cache which contains the latest version.

A cache-to-cache line transfer is disclosed in U.S. Pat. No. 3,771,137 (Barner et al) which requires the following synchronization: (1) main storage must be currently non-busy for a read/write cycle, while simultaneously (2) a cross-interrogate hit castout of a line occurs from one cache to MS, (3) during a line fetch operation by the requesting cache for the castout line. Thus, the line of data is simultaneously stored in MS while it is being readout to the MS bussing from the casting out cache during the line fetch cycle of the requesting cache which is simultaneously receiving the line from the MS bussing. No other transfer to or from MS can be made while a cache-to-cache transfer is being made on the MS bussing.

U.S. Pat. No. 4,078,354 (Beausoleil et al) connects a common main storage bus to all CPU and channel caches and permits cache-to-cache transfers on this MS bus, wherein MS cannot be transferring or receiving data to or from any cache while the MS bus is being used for a cache-to-cache transfer.

In U.S. Pat. Nos. 3,723,976 (Alvarez et al) or 4,056,844 (Izumi), when a requesting processor made a fetch request for the line in another processor cache, it was castout and written into main storage and then invalidated in the casting out processor cache, followed by the requesting cache making a line fetch from main storage. No synchronization was needed between the castout and line fetch in the sense that the line fetch could be made from main storage at any time after the castout of the line was completed.

Castout controls for an MP system having copy directories and command queues in its system controllers is disclosed and claimed in U.S Pat. No. 4,136,386 to Annunziata et al.

Line shareability is disclosed in U.S. Pat. No. 3,735,360 to Anderson et al which discloses and claims the fetch only (i.e. read only) shareability designation provided for any line in plural processor SIC directories, which enables parallel shareability of read only designated lines in plural SICs in a MP, so that plural processors in a MP can simultaneously read data from the same line in their different caches as long as its fetch only bit is set to fetch only state in each cache, which eliminated cross-interrogation between caches and avoided invalidation and line fetching for the readonly lines as long as no processor attempted to store into a read only line. If any processor requested a fetch of a data line not in its cache when the line was held fetch only in another processor cache, the line was castout to MS and then fetched from MS into the requesting cache in which it was also designated fetch only.

U.S. Pat. No. 4,394,731 to F. 0. Flusche et al and assigned to the same assignee as the subject application provides an improvement in overall MP system performance by causing an exclusively (EX) designated processor (IE) request not available in the local CPU cache to result in a remote cache having the line entry to retain its copy of the line with a readonly (RO) designation for the situations in which: (1) the remote line is designated exclusive (EX) but has not been changed in the remote CPU's SIC, or (2) the remote line is designated RO in the remote CPU SIC. In these cases, the final shareability designation for all copies of the line in all SICs is RO instead of EX as would previously have happened for an exclusive IE request which would have eliminated the shareability of the line. Each CPU SIC has a processor directory (PD) and a copy directory (CD) in which the CDs are used for SIC cross-interrogation between CPUs to reduce XI interference with the PDs. Each CD line entry contains a copy of the EX bit and the address found in a corresponding line entry in the PD. The address and EX bit state for a requested line are tested during cross-interrogation and can reduce disturbance to the corresponding SIC if RO state is found. If the CD entry is in EX state, a change (CH) bit is tested in the corresponding PD entry to determine if the line needs to be castout of the corresponding SIC or merely changed to RO state and shareability allowed.

The following specifications assigned to the same assignee as this application are incorporated by reference into the subject specification: (1) U.S. Pat. No. 4,317,168 filed Nov. 23, 1979 entitled "Cache Organization Enabling Concurrent Line Castout and Line Fetch Transfers with Main Storage" by B. U. Messina et al, and U.S. Pat. No. 4,332,010 filed Mar. 17, 1980 entitled "Cache Synonym Detection and Handling Mechanism" by B. U. Messina et al.

SUMMARY OF THE INVENTION

This invention provides an improvement in overall MP performance by providing special hardware for handling cross-interrogation hit (XIH) castouts from a SIC (store-in-cache) in a novel manner. The hardware involves line output buffers from respective CPU caches in a MP connectable to plural bussing for transferring a line of data from one cache to any other cache, to any I/O channel processor, or to MS. The plural bussing permits simultaneous and independent data transfers to occur cache-to-cache, cache-to-channel, MS-to-cache, and cache-to-MS.

A cache-to-cache transfer by this invention may leave the transferred line exclusively (EX) in only the requesting cache, or leave multiple readonly (RO) copies in both a sending cache and a requesting cache. An exclusively (EX) received line may differ from the MS copy of the same line (i.e. having the same MS address). However, multiple readonly (RO) copies of a line in plural caches must be the same as the copy of the line in MS in the preferred embodiments. Thus, there need be no corresponding line transfer to MS if the result of an exclusive request is a cache-to-cache transfer (which leaves only a single EX copy in the requesting cache which may be different from the corresponding line in MS when the sending cache has its change (CH) flag on). However, a RO requested line transferred cache-to-cache is also transferred to MS if the sending cache has its CH flag on (in order to have the received line the same as the corresponding MS line with the same address), so that the CH flag in all RO cache copies of the line can then be set off (indicating each RO copy in any cache is now the same as the corresponding MS line). If the CH flag is off for a RO line transferred cache-to-cache, the line is not transferred to MS since the transferred line already is the same as the corresponding MS copy.

An alternative way of handling a RO or EX IE request that finds an EX changed copy in another cache is to transfer the changed line to the requesting cache where it is set with the EX and CH flags on and invalidate the line in the sending cache. The line is not transferred to MS. This alternative way does a cache-to-cache transfer only if the requested line is found changed in the other cache; and if the line is found unchanged, the line is fetched from MS.

A cache-to-channel transfer is done in some of the described embodiments, where the line is transferred to MS regardless of the state of the CH flag for the line, and the channel only accepts a fraction of the cache sent line. Thus, when the channel later requests the remainder of the line, it is obtained from MS and does not require any further interference with the sending cache, which may at that time be performing an unrelated operation.

In a plural SCE embodiment (which may use module technology involving a limited number of module pins in relation to a high circuit count in current VLSI circuitry), this invention allows the use of crosspoint switching circuits from the cache output buffers to the local BCEs, MS section and I/O channel processor elements and to any remote SCE and its connected elements. The crosspoint switching circuits provide a plurality of independent and interchangeable busses connected from the cache output buffers to the other local elements and the remote SCE. The crosspoint switching circuits select among the plural busses for sending any line from a sending cache to a receiving cache or channel. That is, a request for a line transfer by a channel or cache (after a sending cache is found by a cross-interrogation hit, XIH) causes a crosspoint switch in the sending SCE to select any available bus for the data transfer from cache buffer to local or remote cache, or from cache buffer to the local or remote channel, or/and from cache buffer to local or remote MS section. The crosspoint switching can also be used for selecting the independent busses for other uses such as data transfers from a local or remote MS section to any cache.

In certain cases a sending cache may be required to send the requested data line both (1) to the requesting cache or channel, and (2) to MS. This is done with one line transfer from the sending cache to its output block buffer (OBB) which may be done by contiguous or interruptable transfers of subunits of the line. Then the line may be transferred twice from the OBB, first to the requesting cache or channel, followed by an asynchronous transfer to MS while the sending cache is available for parallel unrelated operations.

Objects of this invention are to:
1. Provide a line transfer between caches in a MP during consecutive machine cycles of the receiving cache, even though the sending cache may have a discontinuity in its transmission cycles.
2. Have a cache-to-cache or cache-to-channel line transfer occur at the same time that the sending cache is requesting or receiving another line from main storage (MS) on the MS bussing by using a cache of the type disclosed in previously cited U.S. Pat. No. 4,317,168 filed 11/23/79 entitled "Cache Organization Enabling Concurrent Line Castout and Line Fetch Transfers with Main Storage" by B. U. Messina et al and assigned to the same assignee as the subject application. Also any cache in this invention may be involved simultaneously in two independent cache-to-cache transfers, as both a sender and a receiver. Furthermore, a receiving or sending cache may be accessed by its respective IE during an overlapping line fetch or castout.
3. Provide a cache output line buffer as a multiple staging point for multiple line transfers while only disturbing the sending cache for one line transfer. The buffer also can provide smoothing in the line transfer out of the line buffer.
4. Have a cross-interrogate hit (XIH) castout line transfer start with the IE requested data unit (e.g. doubleword) and proceed to provide the entire line to a requesting cache at a faster speed than would be possible with the prior manner of transferring a XIH castout line through main storage from one cache to another cache.
5. Permit a subsequent transfer to main storage (MS) for a changed line from a cache output buffer after a related prior cache-to-channel (or cache-to-cache for an RO request) transfer is completed, without the need for any synchronization of the subsequent MS transfer with the related prior transfer of the same line, or the need for any synchronization with MS of the cache-to-cache or cache-to-channel transfer. That is, MS may be busy with an unrelated access and unavailable during any cache-to-cache or cache-to-channel transfer.
6. Permit a cache-to-channel transfer of a part of a cache line (starting with the channel requested data unit) from a cache output buffer (followed by a cache-to-MS transfer of the entire line from the output buffer), so that the channel can thereafter obtain the remainder of the line from MS without interfering with any CPU operation.
7. Alternatively, avoid any transfer to MS for any cache-to-cache transfer by doing a cache-to-cache transfer only when the sent line is changed (in relation to the corresponding MS line). Then the change and exclusive flags are set on for the requested line in the requesting cache directory, regardless of whether the IE requested the data exclusive or readonly.
8. Provide the shortest and fastest physical path for a transfer of data between caches, or from any cache to any channel processor. The transfer is not delayed by MS being busy, as occurs with prior cache-to-cache transfer systems.
9. Provide crosspoint switching to support a plurality of busses for cache-to-cache, cache-to-channel, and cache to MS paths in which the number of bus paths controlled by data switches is less than the number of logical paths between terminal transfer locations, in which the number of actual physical paths are under the pragmatic constraints of limited I/O pins on circuit modules which support VLSI circuitry.
10. Enable the same cache error correcting and checking circuits to be used for cache-to-cache and cache-to-channel transfers as are used for cache-to-MS transfers.

BRIEF DESCRIPTION OF THE DRAWINGS

FIG. 1 is a general block diagram of a multiprocessing system in which the subject invention may be used.

FIG. 2 generally represents a first embodiment with fixed plural data bussing between plural SCEs in an MP.

FIG. 5, comprised of FIGS. 5A, 5B and 5C, illustrate the combination of parts and their connections in each system control element (SCE) pertinent to a described embodiment of the invention.

FIG. 6 shows the format of a BCE request command bus to its SCE and illustrates examples of different types of commands which can be transmitted on this bus.

FIG. 7 illustrates the cross-interrogate (XI) request bus which connects between an SCE and one of its BCE having a XI hit line in the MP and illustrates examples of different types of XI requests which can be transmitted on this XI bus.

FIG. 8 illustrates the form of the XI response bus which connects between a responding BCE and its SCE in the embodiment and the examples of types of responses which can be transmitted on it.

FIGS. 9A and 9B illustrate the flag bits found in each line entry in each processor directory (PD) and in its corresponding copy directory (CD).

FIG. 10 illustrates a SCE response command bus from any SCE which is sending a XI hit line from a sending BCE or MS to a receiving BCE and shows examples of different types of SCE response commands which can be provided.

FIG. 11 illustrates the XI search address register and some of its input controls.

FIG. 12 illustrates the request ID (RQID) hit logic provided at the output of each SCE copy directory.

FIG. 13 illustrates the write controls for the SCE copy directory.

FIG. 14 illustrates the cross-interrogate request register (XIRR) circuits.

FIG. 15, comprised of 15A and 15B, shows the cancelled fetch controls in the SCE.

FIG. 16, comprised of 16A and 16B, illustrates the RQID in response to cross-interrogate (XI) controls in the SCE.

FIG. 17 illustrates the main storage response controls in the SCE.

FIG. 27, comprised of 27A and 27B, illustrates the XP switching circuits.

DESCRIPTION OF THE EMBODIMENTS

Figure 4:
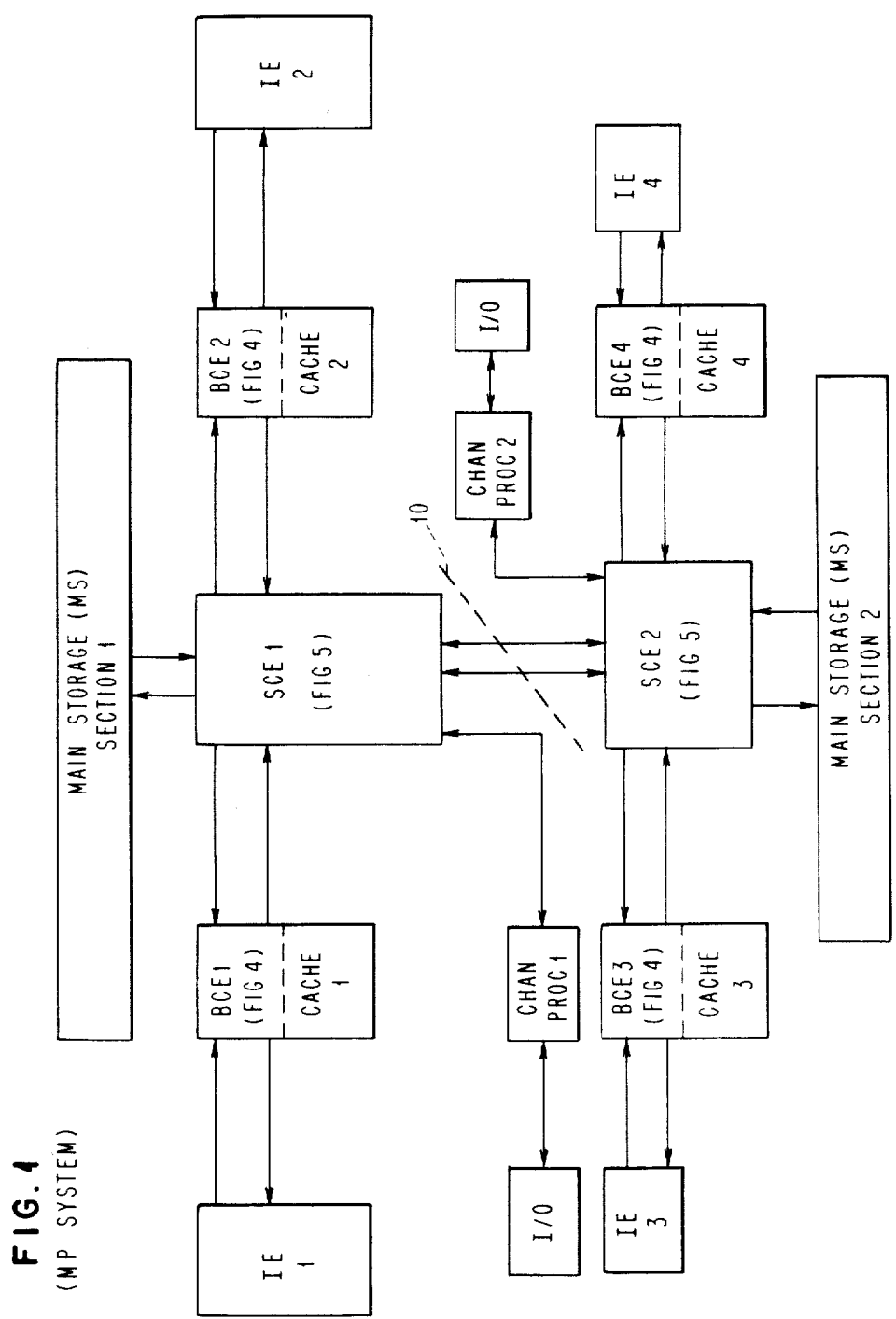
FIG. 4 illustrates an internal diagram of the combination of parts of each buffer control element (BCE) pertinent to a detailed described embodiment of the invention.

FIG. 1 represents a multiprocessing (MP) system which may contain any of several embodiments of the invention. The MP illustrated in FIG. 1 comprises four central processors IE0 through IE3. Each IE is an instruction execution unit and connects to a respective cache in a buffer control unit (BCE) to comprise a respective CPU. Each IE includes the hardware and microcode for executing instructions which require the fetching and storing of operands and other instructions in main storage (MS). The IE begins a fetching or storing operation by issuing a fetch or store command to its cache controls (i.e. its BCE). Each BCE includes a processor store-in-cache (SIC), an associated processor directory (PD), and all cache controls. The IE generally issues a fetch or store command for each doubleword (DW) unit required by the IE. A fetch command will indicate to the BCE whether the IE considers the data to be readonly (i.e. shareable) or to be exclusive (i.e. non-shareable). All store IE commands provide an exclusive signal. If the requested DW is found in the cache (as is the case with most processor fetch and store commands), the DW is fetched or stored in the cache in accordance with the command, and the command is completed without any need to go outside of the BCE. Occasionally, the required DW is not in the cache, or is in the cache but does not have the proper shareable designation (i.e. RO or EX), which results in a cache miss. Before the IE fetch or store command can be completed, the line of data having the requested DW must be transferred into the cache, or the designation for the line in the cache must be changed. To do this, the BCE generates a corresponding fetch or store miss command which requests an associated system controller element (SCE) to obtain the line unit of data having the DW required by the IE, or to change the requesting CPU's shareability designation of a line existing in the requesting cache. A BCE fetch or store miss command is also referred to herein as a "BCE request".

Each line unit has an MS address on a line boundary, but a required DW may be any of plural DWs (e.g. 16 DWs) in the required line.

In the MP in FIG. 1, two system controller elements, SCE1 and SCE2, each have data and control busses connected to two BCEs and to respective sections 1 and 2 of the main storage (MS) that comprise different basic storage modules (BSMs). Thus, each of the four BCEs connects directly to one MS section and one I/O channel processor via its BCE and local SCE, and each BCE connects indirectly to a remote MS section and a remote I/O channel processor busses between its local SCE and the remote SCE. Thus, any BCE can communicate via its local SCE with any other BCE or any I/O processor, or any main storage section.

The plurality of busses connected between the two SCEs in FIG. 1 may be dedicated to a particular type of signal, or they may be independent and interchangeable for different types of signals. They also may be unidirectional busses, bidirectional half-duplex (i.e. one way at a time), or bidirectional duplex (i.e. both directions at the same time). Unidirectional, half-duplex bidirectional, and full-duplex bidirectional transmission lines controlled by crosspoint switches are generally well known in the prior telephone arts. Unidirectional, half-duplex bidirectional or full duplex bidirectional busses are used as old elements in the novel combination of elements providing the subject invention, which involves novel ways of obtaining data line transfers from cache-to-cache, from any cache to any local or remote I/O channel, and between any cache and any local or remote MS section.

The "local" and "remote" nomenclature used herein are relative terms. They refer to a local SCE and a remote SCE in relation to a particular BCE. Any BCE (which is the subject of a discussion) is directly connected to the "local" SCE, and the other SCE is the "remote" SCE. Thus, either SCE may be the local or remote SCE depending on which BCE is the center of discussion. The "local" SCE is also directly connected to the "local" channel processor and the "local" MS section, and the other SCE in the MP system is the "remote" SCE connected to remote BCEs, the remote channel processor, and the remote MS section. In regard to the BCEs connected to the same SCE, if one BCE is referred to as the local BCE, then the other BCE is referred to as the "other" BCE, as distinguished from the "remote" BCEs which are connected to the remote SCE.

The system in FIG. 1 may be divided into two independent systems by cutting it along line 10, thereby not having the SCE-to-SCE connections; wherein each system has a single SCE and operates independent of the other system which need not exist. In a single SCE system, cross-interrogation is only done for one other cache (instead of for three other caches in the two SCE system). That is, the XI operation is performed within the single SCE by examining the content of a copy directory (CD) for the other BCE. Then a cache-to-cache transfer is from one cache to the other and always involves only the local SCE.

However, in the two SCE system, each BCE request must have a XI operation that examines not only the CD of the other BCE but also the remote CDs in the remote SCE for the remote BCEs.

Symbols are used herein in various places as a shorthand way to refer to different types of items of the same type. Different items of the same type are distinguished by different subscripts on the same type of item. For example, a cache is symbolically represented by the letter C. A requestor is symbolically represented as Q. For example, a requesting cache is C(Q), the requesting BCE is BCE(Q), its processor directory is PD(Q), and its copy directory is D(Q).

When an IE cannot find a requested doubleword (DW) in its cache by examining its PD(Q) in its BCE(Q), a cache miss occurs and the BCE(Q) initiates a line fetch (LF) request by sending a BCE command to its local SCE, which then reissues the command as a request to main storage (MS) and as a XI request for searching all other CDs in the local and remote SCEs. If a cross-interrogation (XI) finds any CD to indicate the requested data is in another cache, it is designated as a cache having a cross-interrogation hit (XIH), indicated symbolically as C(XIH), which has its BCE symbolically represented as BCE(XIH) and its CD symbolically represented as D(XIH). Then C(XIH) has the line of data required by C(Q); and C(XIH) becomes the the "sending" cache for the line transfer to the requesting cache, C(Q).

The SC sequences its received BCE commands in an orderly fashion, based on the availability of the requested BSM, the time of arrival of the requested data and the request's priority. For accessing MS, a real address to physical address transformation is performed to determine the BSM location of the real address (see U.S Pat. No. 4,280,176 filed 12/26/78 by K. G. Tan). At the same time, the BCE request is sent to a storage key array to check for a possible storage protection as well as to the CDs in all SCEs to search for a possible XIH. Thus, during the normal sequence of handling a BCE request, the SCEs are constantly monitoring the status of the storage protect key and CD searches, examining the updated status of all pending commands currently held in the SCE, and is also looking for any new BCE commands that may be waiting in the BCE to be received by the SCE.

The main storage protect key arrays may be the type described and claimed in U.S. Pat. No. 4,293,910 filed July 2, 1979 F. 0. Flusche et al, assigned to the same assignee as the subject application. It performs the key operations defined by the IBM System/370 architecture. Normally, the storage key is checked in parallel with the issuance of the BCE request and this check does not interfere with actual main storage access time.

Thus each SCE in FIG. 1 contains a pair of copy directories. Each copy directory (CD) represents the contents of a corresponding processor directory (PD) in one of the local BCEs connected to the respective SCE. Each entry in the PD has a corresponding entry in the respective CD, which are addressable by different forms of the same requesting address; the PD is addressed by a logical address from the IE, while the CD is addressed by its translated absolute address only when the logical address misses in the PD.

The copy directories receive all cross-interrogation (XI) requests, so that the PDs in the various BCEs will not need to handle the XI interrogation requests and can thereby better service their respective IEs. The XI control busses within each SCE and between SCEs connect all CDs to search for conflicts (i.e. XI hits) so that XI searching is avoided in the PDs.

Each IE unit may be presumed to be basically similar to IE units found in conventional large CPUs.

Each data bus in the described embodiments is a doubleword (DW) wide and transmits one DW per machine cycle, so that for example a line of 16 DWs requires 16 cycles to transfer the line on the bus.

Because of the nature of a store-in-cache (SIC), each IE updates lines of data in its SIC, which are not stored in MS immediately. Thus, many lines of unchanged and changed data may be scattered among the SICs being respectively accessed by the different IEs. Unchanged SIC lines are also available in MS, but a changed line is only available in the SIC in which it resides. Changed data will not be available in MS until the data is later castout (CO) of its SIC due to: (1) a XIH CO, or (2) a replacement CO caused when the cache line space is required for another line to be received from MS or from another SIC having a XIH. Thus, the replacement CO is caused in the requesting BCE by a new IE request needing the space in its cache, while the XIH CO is caused in another or remote BCE by a XIH therein.

FIGS. 9A and 9B illustrate the field formats in corresponding entries in the associated PD and CD, in which a one bit in the EX field represents the EX non-shareability designation and a zero bit represents an RO shareability designation for the corresponding line of data in the associated SIC. In general, any IE fetch command provides a readonly (RO) shareability designation when the IE does not expect the instruction or operand to be changed. However, when the IE expects the operand data to be changed, the IE command uses the exclusive (EX) non-shareability designation.

An IE request for a doubleword (DW) unit is accessed from a line unit of operand data and/or instructions in its cache, in which each line unit has plural DWs (e.g. 16 DWs) which are transferred as a unit. Line units are used in the cache and in MS to improve main storage accessing efficiency. Therefore each cache directory is organized to manage its content on a line basis. MS is organized to access its data in a line unit. Therefore, all flags in a cache entry in any PD or CD apply to a cache data line unit, and not on a DW unit basis, even though the IE requests only a DW unit of data or instruction.

Hence, the line shareability designation is checked for each DW unit request by an IE to its cache. Any IE EX request for a DW from a cache line having a RO designation causes XI request activity to invalidate any corresponding copy of the line in any other cache in the MP before changing the local line designation from RO to EX. But any IE RO fetch request is immediately accessed when the data is in the cache regardless of whether it has an RO or EX designation, and then no cache miss nor XI occurs. If the line designation is EX, any IE EX fetch or IE store request is immediately accessed in the cache, and no cache miss occurs. Thus, when any IE initiates an instruction fetch request, or an operand fetch or store request, the IE issues a fetch or store command for a doubleword (DW) of instruction or data to its BCE with one of the following two types of sharing control designations (which are based on the IE expectations for change (or no-change) to the requested data in the accessed cache line and are to be distinguished from the RO/EX designation found in the accessed line entry in the PD):

IE Readonly (RO) Command: The requested DW in the line in the cache may be immediately fetched regardless of whether the PD line designation is RO or EX. Different IEs therefore can simultaneously fetch different but identical copies of a RO designated line in their SIC's as long as they use only IE RO fetch requests for the data in the line.

IE Exclusive (EX) Command: Any requested DW in an EX designated cache line may be fetched or stored into by the IE. Only one cache in the MP can possess a particular line of data designated EX. If the local cache does not have the requested line, or has the line with a RO designation, the CDs for all other IE's are XIed. If the XI finds another cache possesses the line, the other cache must CO the line and its SCE must transfer the line to the requesting IE's cache. If the line was changed in the sending cache (i.e. its CH flag is on), it will be designated EX in the requesting caches PD and CD which will then be the only cache containing the latest version of the line; and the line version in MS is not the latest version and should not be accessed. Therefore, after the XIH cache castouts the line, it is invalidated.

IE Conditional Exclusive (CEX) Command: If the line in the XIH cache is not changed (i.e. its CH flag is off), and the request is an IE EX fetch command, the sending cache will continue to contain the line with a RO designation and the requesting cache will receive and designate the line RO in spite of the IE EX request in accordance with the rules described in prior cited U.S. Pat. No. 4,394,731. If the line is changed in the XIH cache, it is invalidated and sent exclusively (EX) to the requesting cache.

When a BCE receiving an IE request has a cache miss, it generates a BCE command of the type as shown in FIG. 6, which is a request having the shareability designation of the IE request initiating the BCE command.

Each BCE request command is transmitted on a BCE request command bus to the local SCE. Then the local SCE generates a request to MS to fetch the line of data, and at the same time the SCE moves the BCE request command to an XI search address register (XISAR) from which the command is sent to search its other CD and is sent to the remote SCE on the XI bus to perform an XI search in the remote CDs. Hence the BCE command not only is used by the local SCE to search its other CD, but the command also is sent on an SCE to SCE control bus to the remote CDs in the MP in order to search the remote CDs for the absolute address in the BCE command. Each CD search uses the command's absolute address to find the respective CD contains the requested line address. This manner of directory addressing is the subject of previously cited allowed U.S. Pat. No. 4,332,010 filed Mar. 17, 1980.

Figure 3A:
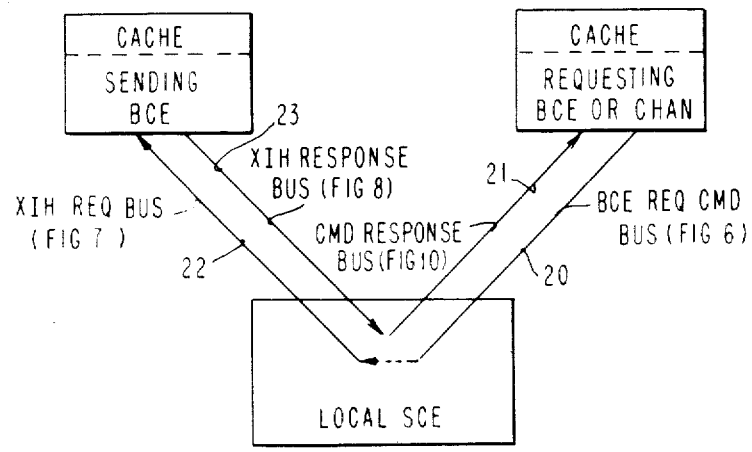
FIGS. 3A and 3B are single-line diagrams of control busses providing control signalling in respective one SCE and two SCE embodiments to obtain a data line transfer from a sending cache to a requesting cache.

FIG. 3A is a single-line diagram of control busses providing the control signalling in the detailed embodiments to obtain a data line transfer from a sending cache to a requesting BCE or channel connected to the same SCE.

Figure 3B:
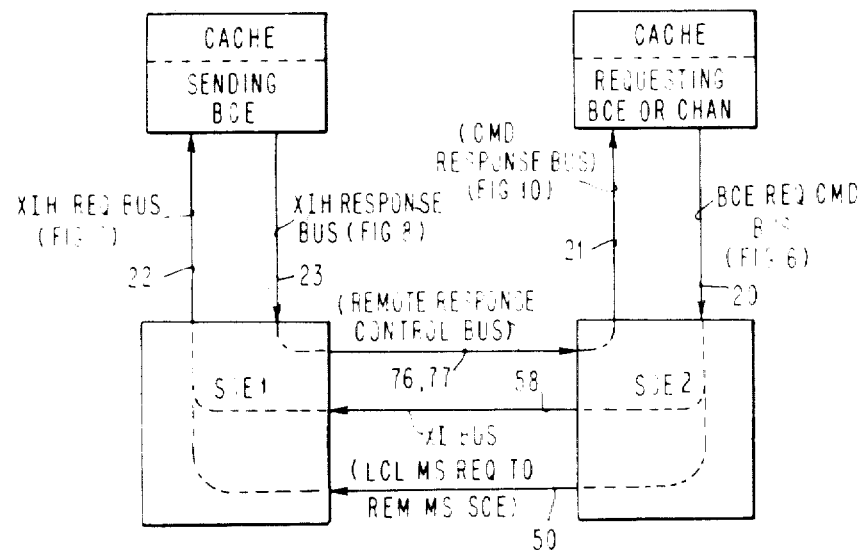
Figure 18:
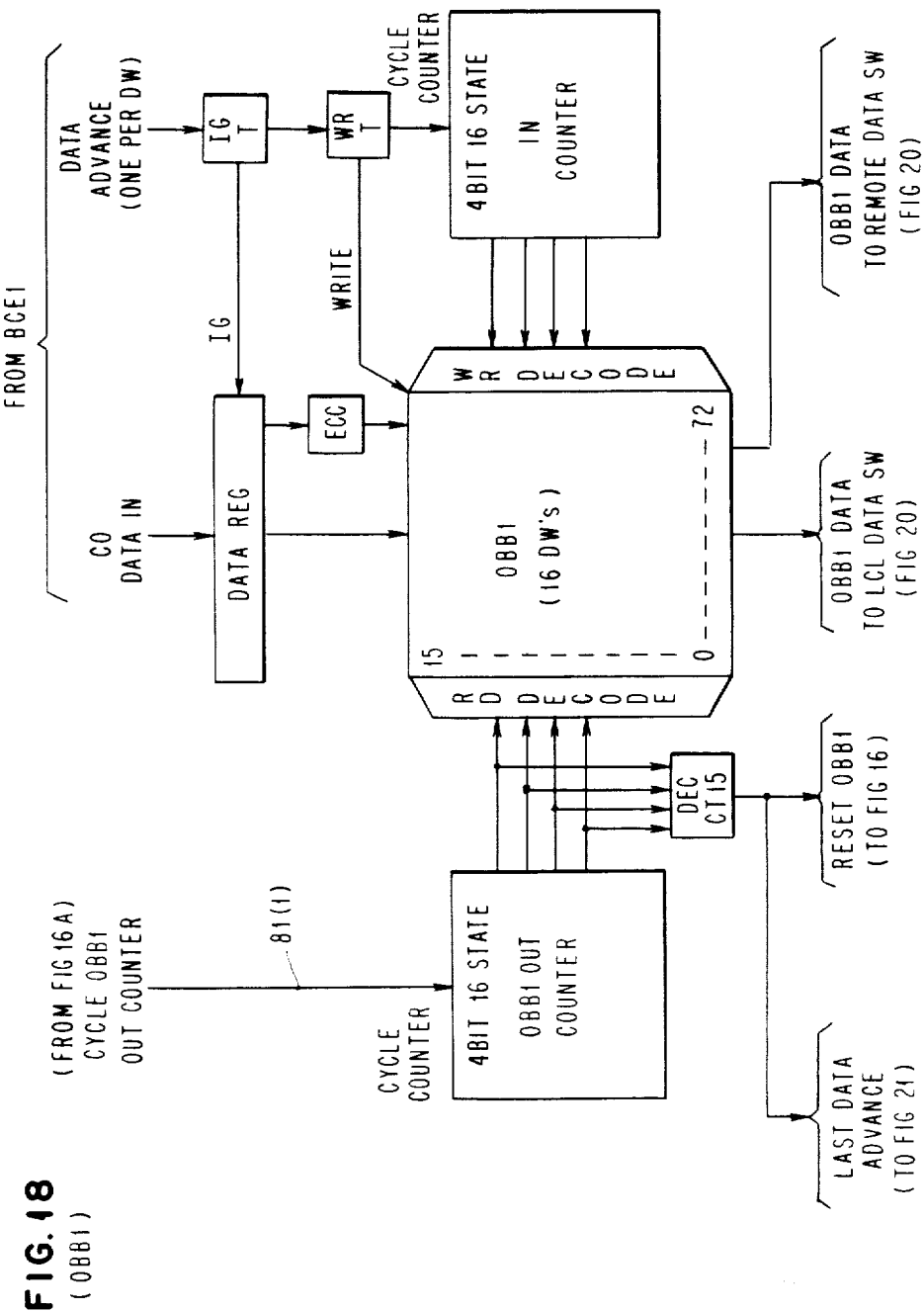
FIG. 18 illustrates the RQID output block buffer (OBB) in the SCE.

FIG. 3B is a single-line diagram of the control busses providing the control signalling in the detailed embodiments to obtain a data line transfer from a sending cache to a requesting BCE or channel connected to a remote SCE.

No data busses are shown in either FIGS. 3A or 3B, but FIG. 2 provides a single-line diagram of the data bussing used in one embodiment.

In FIG. 3A or 3B, the protocol of signalling operations is initiated by a BCE detecting a cache miss and thereby generating a BCE request command for the missed line of data. The BCE request command is signalled to the local SCE on a BCE request (REQ) command (CMD) bus 20. The particular form of the signals on the BCE request command bus 20 used in the embodiments is illustrated in FIG. 6. The BCE request is received by the local SCE which priority schedules the request for servicing. Then the local SCE determines whether the requested address is in a BSM in the local or remote MS section. If the BSM address is in the remote MS section, then the local SCE transfers the request from the local FAR to a remote FAR in the remote SCE. If the BSM address is in the local MS section, the local SCE will handle the request directly. The selected SCE will then generate the MS request and initiate XI search requests on the SCE non-requestor internal XI bus 56 and/or 57, and in the case of FIG. 3B to the remote CDs on an external bus 58 to the remote SCE.

If any CD has a XIH, its SCE will then generate a XIH request on an XIH request bus 22 to BCE(XIH) which requests the BCE to either (1) castout (CO) the conflicting line from its cache, (2) invalidate (I) the conflicting line, change the designation of the conflicting line from EX to RO (i.e. CERO) or some combination of (1), (2) and (3). The particular form of signals on any XIH request bus 22 used in the detailed embodiments is illustrated in FIG. 7. There are four XIH request busses 22 in the MP of FIG. 1, one to each BCE from its local SCE. They are represented relative to any SCE as bus 22(1), 22(2), 22(1R) or 22(2R), in which R represents "remote".

Each SCE participating in a XI operation retains the requestor's identifier (RQID) in a XI storage address register (XISAR) until the SCE response to the XI request is completed.

If BCE(XIH) is requested to perform a line castout (CO), then BCE(XIH) becomes a "sending " BCE in a cache-to-cache or cache-to-channel transfer, in which the requestor receives the sent line of data.

When BCE(XIH) determines it will comply with the XIH request and perform the CO, or invalidation, or CERO, or some requested combination of them, then BCE(XIH) responds by sending control signals on its XIH response bus 23 to its local SCE. The XIH response bus signals in the detailed embodiments have the form illustrated in FIG. 8. There are four XIH responses busses 23 in the MP of FIG. 1.

When the SCE (local to the sending BCE) receives the XIH response signals in its XIH response controls, the controls enable an associated output block buffer (OBB) in the same SCE to receive any CO line from the sending BCE's cache, whenever a data line is sent. The data transfer occurs on data busses shown in FIG. 2, which are parallel to the control busses shown in FIGS. 3A and 3B.

When the XIH response signals are received by the local SCE, it directly or indirectly partakes in providing a response to the requesting BCE or channel. That is, the local SCE provides a direct response if the requestor is connected to the local SCE as shown in FIG. 3A; but the local SCE provides an indirect response if the requestor is connected to the remote SCE as shown in FIG. 3B.

There are XIH response controls in the local SCE which generate the required direct or indirect XIH response signals using the requestor's identifier stored in the XISAR register in each SCE, in order to enable the response to be sent to the requesting BCE or channel, among the plurality of potential requestors. The requestor's identifier indicates whether the requestor is connected to the local or remote SCE. In this specification, the symbolic suffix (R) attached to a requestor's identifier labels that identifier as being connected to the remote SCE; but if the suffix (R) is not used with the requestor's identifier the requestor is connected to the sending BCE's local SCE (i.e. same SCE connects to both the requesting and sending BCE's).

If the requestor is connected to the remote SCE, then the local SCE responds to the remote SCE with XIH response signals on the remote response control bus 76, 77 shown in FIG. 3B. These signals are received by XIH response controls in the remote SCE and indicate the requestor's identifier to the SCE connected to BCE (XIH).

When the SCE which is connected to the requestor receives XIH response signals either directly or indirectly from the sending BCE, its XIH response controls send command response signals on the command response bus 21 to the requesting BCE or channel to receive the line of data, which is being sent on data busses (shown in FIG. 2) from the OBB of the sending BCE in parallel with the response control signals on bus 21 (shown in FIG. 3A or 3B). The particular form of signals on any command response bus 21 used in the detailed embodiments is illustrated in FIG. 10. There are four command response busses 21 within the MP in FIG. 1.

When the line of data is written into the requesting cache or channel, the cache-to-cache or cache-to-channel data transfer is complete.

The SCE command response signals shown in FIG. 10, when received by the requesting BCE, may also cause the requesting BCE to write into its currently selected entry the PD information needed for a received line; or when no line is transmitted it may write new change and shareability designation status information for a line of data previously contained RO in the associated cache but now is to be contained exclusively in the requesting cache.

The following TABLE 1 entitled "Cache to Cache Transfer Summary" concisely summarizes in detail various examples of sequences of command and response control signals between a requesting BCE and a BCE(XIH), and the resulting data transfer in the preferred embodiment of the invention. In the TABLE, the subscript (Q) associates the subscripted item with the requestor (for example, C(Q) represents the requesting cache, C(XIH) represents the cache with a XIH, and D(Q) represents the copy directory associated with the requesting BCE, and D(XIH) represents the copy directory having a XIH).

TABLE 1

| | | | CACHE-TO-CACHE TRANSFER SUMMARY | | | | |
|---|---|---|---|---|---|---|---|
| (FIG. 6) IE REQ Type | SCE XI SRCH | MX CNCL | CD Update | (FIG. 7) SCE SIGNAL to BCE(XIH) | (FIG. 8) BCE(XIH) RESP to SCE | (FIG. 10) SCE RESP to BCE(R) | DATA TRANS |
| Fetch RO | XI Miss | — | RO→D(Q) | — | — | $\overline{\text{CH}}$ | MS→C(Q) |

TABLE 1-continued

CACHE-TO-CACHE TRANSFER SUMMARY

| (FIG. 6) IE REQ Type | SCE XI SRCH | MX CNCL | CD Update | (FIG. 7) SCE SIGNAL to BCE(XIH) | (FIG. 8) BCE(XIH) RESP to SCE | (FIG. 10) SCE RESP to BCE(R) | DATA TRANS |
|---|---|---|---|---|---|---|---|
| | XIH RO | — | RO→D(Q) | — | — | $\overline{CH}$ | MS→C(Q) |
| | XIH EX | CNCL | RO→D(Q) | CO & CERO | CERO Cmplt., CO $\overline{CH}$ | $\overline{CH}$ | C(XIH)→C(Q) |
| | | | RO→D(XIH) | | CERO Cmplt., CO CH | $\overline{CH}$ | C(XIH)→C(Q) C(XIH)→MS |
| Fetch EX | XI Miss | — | EX→D(Q) | — | — | $\overline{CH}$ | MS→C(Q) |
| (Cache Miss) | XIH RO | — | EX→D(Q) I→D(XIH) | I | I Cmplt., No CO | $\overline{CH}$ | MS→C(Q) |
| | XIH EX | CNCL | EX→D(Q) I→D(XIH) | CO & I | I Cmplt., CO $\overline{CH}$ | $\overline{CH}$ | C(XIH)→C(Q) |
| | | | | | I Cmplt., CO CH | CH | C(XIH)→C(Q) |

Note that in the examples in TABLE 1 that cache-to-cache transfers only occur when the BCE request command finds a CD(XIH) in which the conflicting line has its EX flag set to one (i.e. XIH EX). As soon as CD(XIH) detects an exclusive hit, its SCE sends a cancellation signal to MS to cancel the corresponding MS line fetch request. Then the exclusive line is obtained from the cache(XIH) beginning with the requested doubleword (DW) determined by address bits 20-28 in FIG. 6, regardless of whether the line is changed or not in that cache. Even if the line is not changed, it is more efficient to perform a transfer from the cache (rather than reissue the cancelled MS request), since reissuing the MS request would substantially delay when the line would be received by the requesting cache. The described controls then cause BCE(XIH) to cause the associated cache (XIH) to castout and invalidate the requested line beginning with the requested DW and wrapping around the line bound address by means of castout (CO) controls 28 in FIG. 4.

In the case where the XI search finds a XIH RO entry (i.e. finding the EX bit off in the found entry in CD(XIH)), in response to a fetch EX request command from the requesting BCE, the corresponding PD(XIH) invalidates its entry, but the MS request is not cancelled and the line data transfer is from its dual copy in MS to the requesting cache beginning with the requested DW.

In the case of a fetch RO request where the XI search finds a XIH RO entry in CD(XIH), the corresponding PD(XIH) is not disturbed, and the data line is instead fetched from its dual copy in MS to the requesting cache, and the XI operation does not interfer with the operation of BCE(XIH) or its respective IE.

Also note that the only instance in TABLE 1 of a cache to MS transfer occurring is after a cache-to-cache transfer occurs in response to a BCE RO command finding the requested line changed and exclusive in BCE(XIH). In this case, the line is castout from cache(XIH) into its associated OBB in SCE(XIH) and invalidated in CD(XIH) and PD(XIH). Then the line is first transferred from the OBB to the requesting cache beginning with the requested DW, followed by a second transfer from the OBB to MS whenever MS becomes available for the transfer. The transfer from the OBB to the requesting BCE is independent of the availability of the required MS BSM (which may be busy with other accesses during the cache-to-cache transfer). Thus, the transfer to MS is asynchronous with the cache-to-cache transfer and can wait with a low MS priority until whenever MS becomes available for the transfer without affecting MS performance.

The following TABLE 2 entitled "Cache-to-Channel Transfer Summary" concisely summarizes in detail various examples of sequences of command and response control signals and the resulting data transfer between a cache and a channel and/or MS in the preferred embodiment. A channel fetch RO request command (i.e. chan fetch RO) is provided for CCW (channel control word) and channel data fetches while channel fetch EX request commands are provided for operating system control block fetch requests.

TABLE 2

CACHE-TO-CHANNEL TRANSFER SUMMARY

| CH REQ Type | SCE XI SRCH | MX CNCL | CD Update | (FIG. 7) SCE CMD to BCE(XIH) | (FIG. 8) BCE(XIH) RESP to SCE | (FIG. 10) SCE RESP to CHAN(R) | DATA TRANS |
|---|---|---|---|---|---|---|---|
| Chan Fetch RO | XI Miss | — | — | — | — | — | MS→CHAN |
| | XIH RO | — | RO→D(XIH) | — | — | — | MS→CHAN |
| | XIH EX | CNCL | I→D(XIH) | CO & I | I Cmplt., P.CO $\overline{CH}$ | — | C(XIH)→CHAN |
| | | | | | I Cmplt., P.CO CH | — | C(XIH)→CHAN C(XIH)→MS |
| Chan Fetch | XI Miss | — | ' | — | — | — | MS→CHAN |

TABLE 2-continued

| | | | | CACHE-TO-CHANNEL TRANSFER SUMMARY | | | |
|---|---|---|---|---|---|---|---|
| CH REQ Type | SCE XI SRCH | MX CNCL | CD Update | (FIG. 7) SCE CMD to BCE(XIH) | (FIG. 8) BCE(XIH) RESP to SCE | (FIG. 10) SCE RESP to CHAN(R) | DATA TRANS |
| EX | XIH RO | — | I→D(XIH) | I | I Cmplt., no CO | — | MS →CHAN |
|  | XIH EX | CNCL | I→D(XIH) | CO & I | I Cmplt., P.CO $\overline{CH}$ | — | C(XIH)→CHAN |
|  |  |  |  |  | I Cmplt., P.CO CH | — | C(XIH)→CHAN C(XIH)→MS |

Note that if XIH occurs for the line found RO in CD(XIH) for any type of channel fetch request, no cache transfer is done; but instead the data line is obtained from the dual copy in MS. However, if the line is found EX in CD(XIH), the MS request for a line fetch is cancelled, and the line is transferred from the cache to the channel regardless of whether it is changed in the sending cache; and then the changed line is invalidated in the sending cache PD.

In the detailed embodiments, a channel line transfer is presumed to have one-half the length (e.g. eight DWs) of a cache line transfer (e.g. sixteen DWs). Thus, on the cache-to-channel transfer, the channel will be sent only its required eight DWs in the line transfer from the OBB associated with the sending cache. Then the OBB outputs the entire line to MS. Since the channel operates slower than the OBB-to-MS line transfer, the line will be in MS before the channel is ready to request the other half of the cache line. Therefore, the channel can obtain the other half of the cache line from MS without any further interference with the sending BCE operation.

The general description of the embodiments provided thus far applies to all plural SCE embodiments described in this specification.

Figure 25:
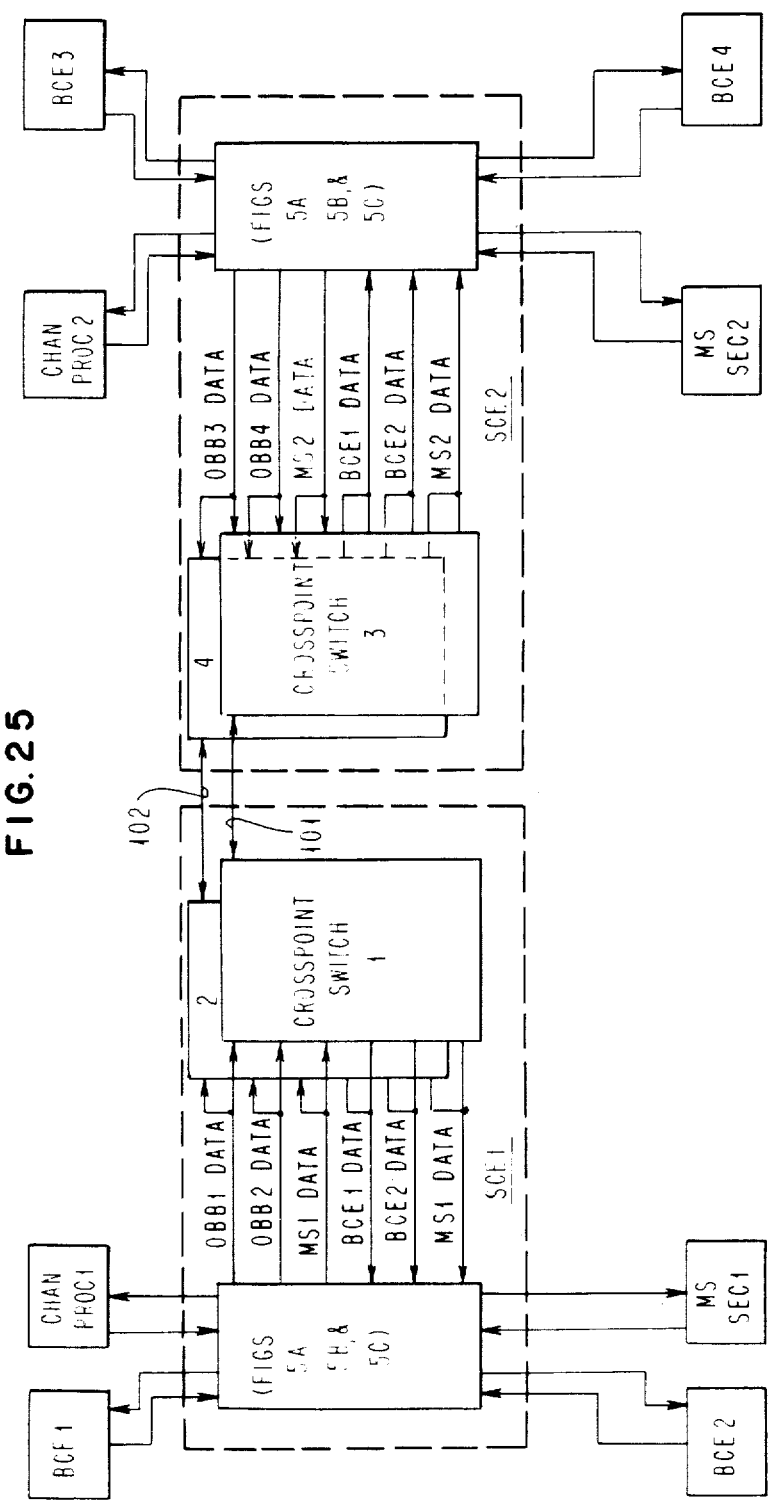
FIG. 25 is another embodiment of the invention having crosspoint switching that provides plural interchangeable busses between local and remote elements.

The first plural SCE embodiment is generally represented by the data bus diagram in FIG. 2 which has its SCE-to-SCE data busses dedicated to respective types of data transfers, such as OBB1, OBB2, MS1, OBB3, OBB4 and MS2. The second plural SCE embodiment is represented in FIG. 25 in which floating busses are provided between SCE1 and SCE2, wherein any one of the floating busses can be selected from crosspoint switch sets 1 and 2 to provide any of the types of transfers done in the embodiment in FIG. 2.

Plural caches can simultaneously and in parallel be transferring and/or receiving independent lines of data to or from other local or remote caches, channels or MS sections.

The detailed embodiments will next be described in the environment of the MP shown in FIG. 1, which contains four BCEs and two SCEs. FIG. 4 is a detailed drawing of BCE1 in FIG. 1 and the component circuits in FIG. 4 are shown in much more detail in FIGS. 21 through 24.

The cache hit controls in the BCE are not shown in FIG. 4 because they are not important to the channel invention. The cache miss controls are summarized in FIG. 4 because they are used by the invention.

The detailed drawings for BCEs 2, 3 and 4 in FIG. 1 are not shown, but they are identical to the drawings for BCE1 except that each of their respective BCE designations is then substituted for the BCE1 label and the BCE1 label is substituted for the respective BCE designation. For example for BCE2, wherever BCE1 is labeled in its detailed drawings, the label BCE2 is substituted; and wherever BCE2 label is found, the BCE1 label is substituted.

FIGS. 5A, B and C are detailed drawings of SCE1 and some of the SCE components in FIGS. 5B and 5C are shown in much more detail in FIGS. 11 through 20.

Once the reader understands the operation of the components in FIGS. 4 and 5A, B and C, the reader will understand the operation of the more detailed drawings in FIGS. 11-24, and at times particular questions about the operation of component circuits in FIGS. 4 and 5 may be answered by reference to a corresponding detailed drawing.

Since cache-to-cache data transfers involve communications between two different BCEs, explanation of the detailed operations for any particular line transfer involve the reader understanding that operational reference is being made to two separate sets of BCE drawings as shown in FIG. 4, one for the requesting BCE and one for the sending BCE. If these two BCE connect to the same SCE (i.e. as in FIG. 3A), then one set of SCE drawings as shown in FIGS. 5A, 5B and 5C are involved. But if the sending and requesting BCEs are connected to different SCEs (i.e. as in FIG. 3B), then two sets of SCE drawings are shown in FIGS. 5A, 5B and 5C, one set for SCE1 and another set for SCE2.

The BCE labeling in the SCE drawings of FIGS. 5A, 5B and 5C presumes the SCE represented in FIGS. 5A, 5B and 5C is the "local" SCE in which the BCEs connected to this local SCE are BCE1 and BCE2 while the BCEs connected to the remote SCE are labeled BCE1R and BCE2R, in which R is defined as "remote". This type of relative BCE labeling involving BCEs 1, 2, 1R and 2R in a local and remote context for the detailed FIGS. 4, 5 and 11-24 is useful due to the variable nature of BCE and SCE selection in cache-to-cache or cache-to-channel transfers and avoids problems encountered with a single set of detailed drawings for one BCE and one SCE of the plurality when fixed BCE and SCE labeling is used such as in FIG. 1 having the fixed BCE labeling of BCEs 1, 2, 3 and 4 and SCEs 1 and 2.

In beginning with the detailed explanation of the dedicated bussing embodiment represented in FIG. 2, reference will be made to the detailed drawings in FIGS. 4, 5, 11-24. The processor directory (PD)11 and its BCE controls in FIG. 4 are presumed to be of the type disclosed and claimed in previously cited U.S. Pat. No. 4,317,168 and U.S. Pat. No. 4,332,010. A buffer control address register (BCAR) 12 receives both the local and remote request addresses (i.e. address of the requested DW ending at bit position 28). Each local request address is received from the associated IE. Each remote request address is received from an XI address register (XIAR) 17 connected to the XIH request bus from the local SCE to cause castout invalidation or CERO of a line in the associated cache. PD priority circuits 13 receive a request signal for every input request to the BCE and determine in the conventional manner which of the current input requests is to be allowed to next be inputted into BCAR 12. A request remains in the BCAR 12 for only one cycle, after which it is transferred to LSAR and held until all operations for the request are completed by the BCE.

Most of the requests in BCAR 12 are from the local IE and are for the fetch or storing of a doubleword (DW) and BCAR 12 receives the logical MS address of a DW. Most of the local requests (e.g. 98%) will have hits in the associated SIC and will be completed by the BCE in from one to five machine cycles of operation.

However a few of the local IE requests (e.g. 2%) will miss in the associated cache and will cause the BCE to generate a BCE request command on bus 20 to the local SCE, which will result in cross-interrogation of the copy directories of all other caches in the MP to determine if any of them has the most uptodate copy of the line with the requested DW.

Each XIH request in BCAR12 is caused by a cache miss in some other BCE in the MP which finds a XIH in the CD for this BCE, and an application dependent percentage (e.g. 2% to 50%) of the XI requests will result in an XIH request in this BCE. An XIH request requires some action by this BCE, such as having it castout the line requested by the other BCE and/or invalidate that line, or change its designation to RO in PD11.

If a local IE request has a cache miss, the local request address is transferred through BCAR 12 to LFAR 29 where it is held until the requested line is fetched into the associated cache (beginning with the requested DW) from some other cache or from MS, and the requested IE fetch or store operation is completed in that line in the associated cache. BCAR 12 is then free to handle unrelated requests. Thus, the requesting CPU has the fastest possible access to the requested DW and its immediately following DWs in the data line.

PD11 operates to locate any entry in it which satisfies the current request having a hit in BCAR 12, whether it be a local or XIH request. PD11 operates in the detailed manner explained in previously cited U.S. Pat. No. 4,317,168 and U.S. Pat. No. 4,332,010. A translated absolute page frame address (obtained from a DLAT in the BCE and corresponding to the current address in BCAR 12) is inputted to a line fetch address register (LFAR) 29 and a line store address register (LSAR) 30 into bit positions 5–19, and bit positions 20–28 (resolving the requested DW) are directly inputted from BCAR 12, while the GID and SID inputs are provided from select circuits 26. The group identifier (GID) obtains class group synonym resolution to a particular one-fourth of the cache, and then set identifier (SID) locates the required PD entry in the selected congruence class (i.e. row of four entries in PD11 selected by bit positions 20–24 from BCAR 12) as explained in previously cited U.S. Pat. No. 4,332,010. U.S. Pat. No. 4,317,168 explains the LFAR and LSAR registers.

Upon a cache hit, the DW address is provided to the associated cache on local BCE address bus 14 from LFAR 29 or LSAR 30 for a DW fetch or store operation into the cache to complete the current IE request in BCAR 12.

A cache miss is detected in FIG. 4 after the select circuits 26 have examined all entries in the selected congruence class and do not find any hit. Then a cache miss is signalled to an AND gate 42 and to the BCE request command controls 16. Controls 16 output the flag bits (defined in FIG. 6) of the BCE request command to bus 20 to the SCE, while AND gate 42 outputs to bus 20 the line fetch address from LFAR 29.

Conventional replacement selection circuits within select circuits 26 in the BCE select one of the entries in a selected congruence class for receiving the line to be fetched from MS or another cache. The GID and SID for locating this selected entry are stored into LFAR 29.

In FIG. 5A, the SCE receives the BCE request command on bus 20 from the BCE in FIG. 4 and enters the command into a fetch address register (FAR) associated with the local BCE sending the command. For example, FAR1 receives all BCE request commands from BCE1 in the local SCE. The command remains in FAR1 as it contends for SCE priority with any other requests in FAR2, FAR3, STAR1, STAR2, STAR3, remote FAR and remote STAR, which all provide inputs to the SCE fetch/store priority controls 46 in FIG. 5B (which receive a signal for every request made to the SCE) and determines which request will next get priority to use the SCE resources. When priority controls 46 give FAR1 priority, it is signalled on a line 48 which activates an AND gate 49 to transfer the command through an OR gate 51 into a XISAR 47 which is then being enabled by control 46. At the time the command is gated into XISAR 47 to begin a XI search request, an MS request is provided from the output of an AND gate 52 which also receives the command from FAR1 and is being simultaneously enabled by priority control 46.

Prior to the MS request being made, the MS local or remote section having the requested data is determined by a BSM control array (BCA) circuits of the type described and claimed in U.S. Pat. No. 4,280,176 filed Dec. 26, 1978 by K. G. Tan entitled "Memory Configuration, Address Interleaving, Relocation and Access Control System", which issued on July 21, 1981 and is assigned to the same assignee as the subject invention. In that application, the absolute address for the current request generated in the BCE is looked up in the BCA to determine the section of MS containing that absolute address. The BCA (not shown in this specification) operates with the output of the DLAT to identify the local or remote MS section having the current request. In this manner, the MS request (which is the address of the required doubleword) is sent to the identified local or remote MS section. It is the SCE local to the required MS section that transfers the request to an XISAR for an XI operation. When the request is in the remote MS section, the availability of remote FAR 59 in the remote SCE will cause the local SCE priority controls 46 to transfer the request to the remote FAR of the other SCE where it contends for service with requests local to that SCE.

If the line is found exclusively in another cache, the issued MS request is cancelled by cancel fetch control 53 in FIG. 5C and a data line beginning with the requested doubleword is obtained from that cache.

The fields set in XISAR 47 are shown in FIG. 11, which include setting a one bit into the field for the requesting BCE to indicate to the SCE that all local and remote CDs are to be searched except the CD for the requesting BCE. The requests SID and GID are also remembered in XISAR 47. In FIG. 11, the low order address bit 28 resolves the requested address to the requested doubleword (DW).

After the BCE request is received by XISAR 47 in FIG. 5B, the BCE request (i.e. address of the requested doubleword) is then transmitted on an intra-SCE bus 57 to the other CD (i.e. for BCE2), and simultaneously on an XI bus 58 to the remote SCE where the command is received into the XISAR remote hold register 45 of SCE2 when priority is given, in order to search CDs for BCE1R and BCE2R using signals on busses 56 and 57 in SCE2 to determine if there is any conflict (i.e. XIH) with any line in caches 1R or 2R in the MP (represented by caches 3 or 4 in FIG. 1).

In FIG. 5B, the hit logic 59(1) or 59(2) at the output of each copy directory determines if there is any XIH in the respective CD. The detailed circuits in hit logic 59 are shown in FIG. 12.

If any XIH signal occurs in either the local or remote SCE, it indicates that the corresponding local BCE contains a cache which may be required to send a line of data to the requesting BCE, which may be connected to the same SCE or to the remote SCE. Such line transfer begins with the request address defined by bits 5–28 sent to XISAR for the requested DW. The address of the required 16 DW data line (on a line boundary) is determined by bits 5–24 in XISAR 47 in FIG. 5 and shown in more detail in FIG. 11.

If any XIH is found by hit logic circuit 59(1), the command in XISAR is gated into a XIRR1 61 in FIG. 5C for a BCE1 command under control of an XIH output from the associated hit logic 59(1) to define the requested DW. Likewise, any BCE2 command is gated into XIRR2 61(2) which is otherwise identical to XIRR1. The XIRR1 is shown in detail in FIG. 14. The XIH request command in the XIRR is formulated with information being provided from the output of the XISAR and of the corresponding hit logic 59 to determine whether the hit line shall castout or be invalidated, or retained with an RO designation in the respective CD entry.

The signals from the XISAR indicate the EX/RO state of the BCE request command, and the output of the corresponding hit logic 59 indicates the EX/RO state in the hit line entry in CD(XIH). These inputs to the respective XIRR are represented in TABLES 1 and 2, in which the leftmost column (called the first column) represents BCE fetch requests and their EX/RO designation. The second column in either TABLE 1 or 2 represents the result of the XI search which may be found by hit logic 59. Thus, the XI search may not find the address in the XIed BCE request command, in which case this is an XI miss. If it is found, an XIH results and the found line is designated either RO or XI in the searched CD, and hence it is represented as either XIH RO or XIH EX. If the found line is XIH EX, then the line is accessed from the associated cache and not from MS so that the related MS request is then cancelled (which is indicated in the third column of TABLES 1 and 2. The fourth column in either TABLE 1 or 2 represents the resulting update in the hit CD, symbolically represented as D(XIH), and in the requestor's CD, symbolically represented as D(Q) in the TABLEs. FIG. 13 shows the circuitry in the corresponding CD write controls for performing the CD updates shown in the fourth column in each TABLE.

In this manner the XIRR formulates the request signals for BCE(XIH) which are put on the XIH request bus 22 to the corresponding BCE and are shown in detail in FIGS. 7 and 14 to communicate the requested DW address to the potential line sending source.

The XIH signal in XIRR 61 must be communicated to the BCE having the cache with the line which has been XIH. To do this, the XIH request bus 22 connects the output of XIRR 61 to the corresponding BCE and transmits the request to the BCE in order to tell it to castout the conflicting line from its cache so that it can be transmitted to the requesting cache.

In BCE1 in FIG. 4, XIH request bus 22(1) inputs to XIAR 17 the location of the XIH entry in PD11 and then requests priority in the PD priority circuits 13 to determine when the content of register 17 can be transferred to BCAR register 12, from which the XIAR address is used to look-up the XIH entry in PD11. An XI accept output of priority circuits 13 is provided to corresponding XIH response controls 18 to initiate a response to the XIH request by the BCE back to the local SCE on the XIH response bus 23. This response is determined by the signals received in register XIAR 17, and is represented symbolically in the sixth column of TABLE 1 or 2.

Figure 22:
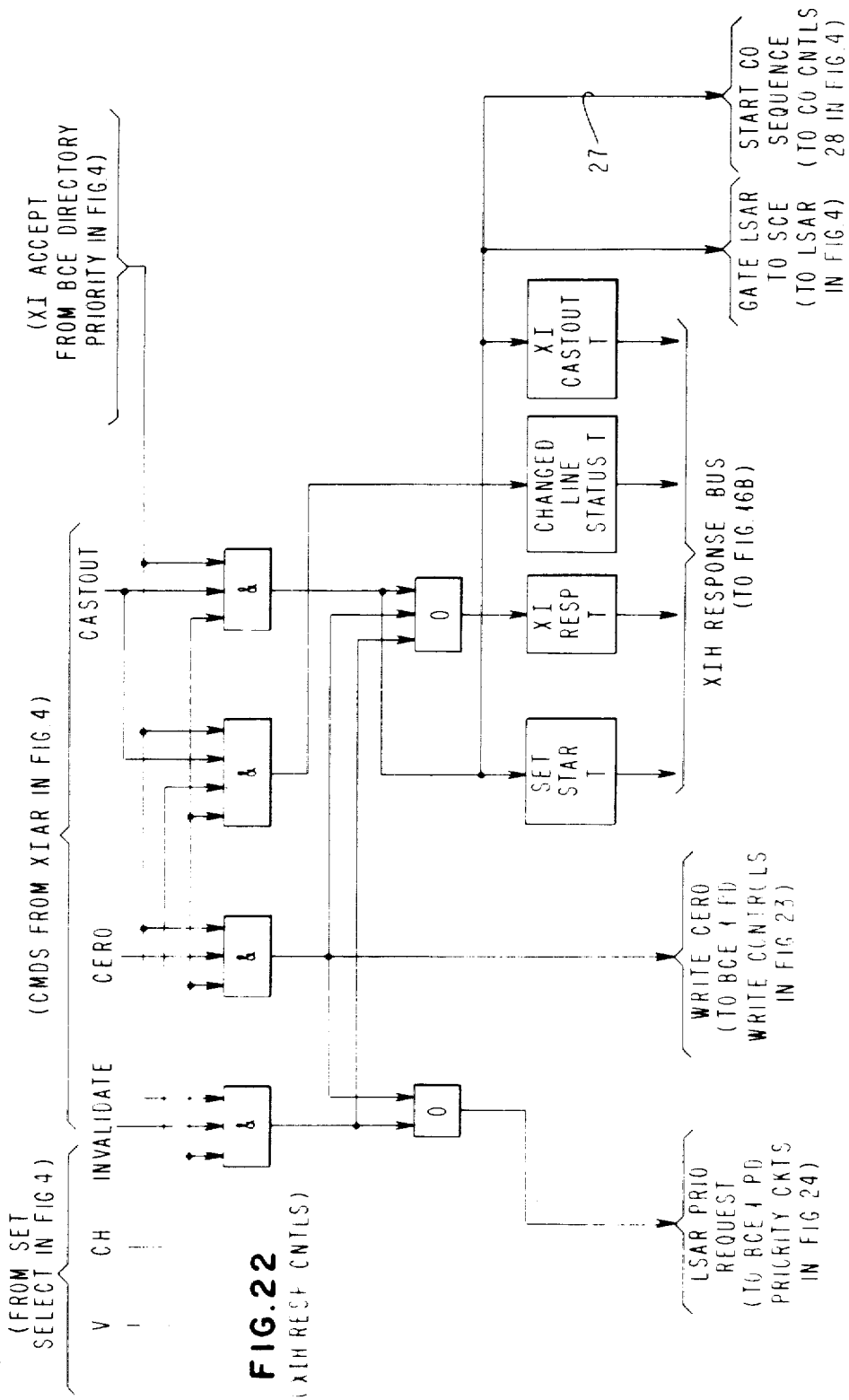
FIG. 22 illustrates the XI response controls in the BCE.

The XIH response controls 18 are shown in detail in FIG. 22 which provides the signals on the XI response bus 23 in accordance with the XIH response format shown in FIG. 8.

Figure 23:
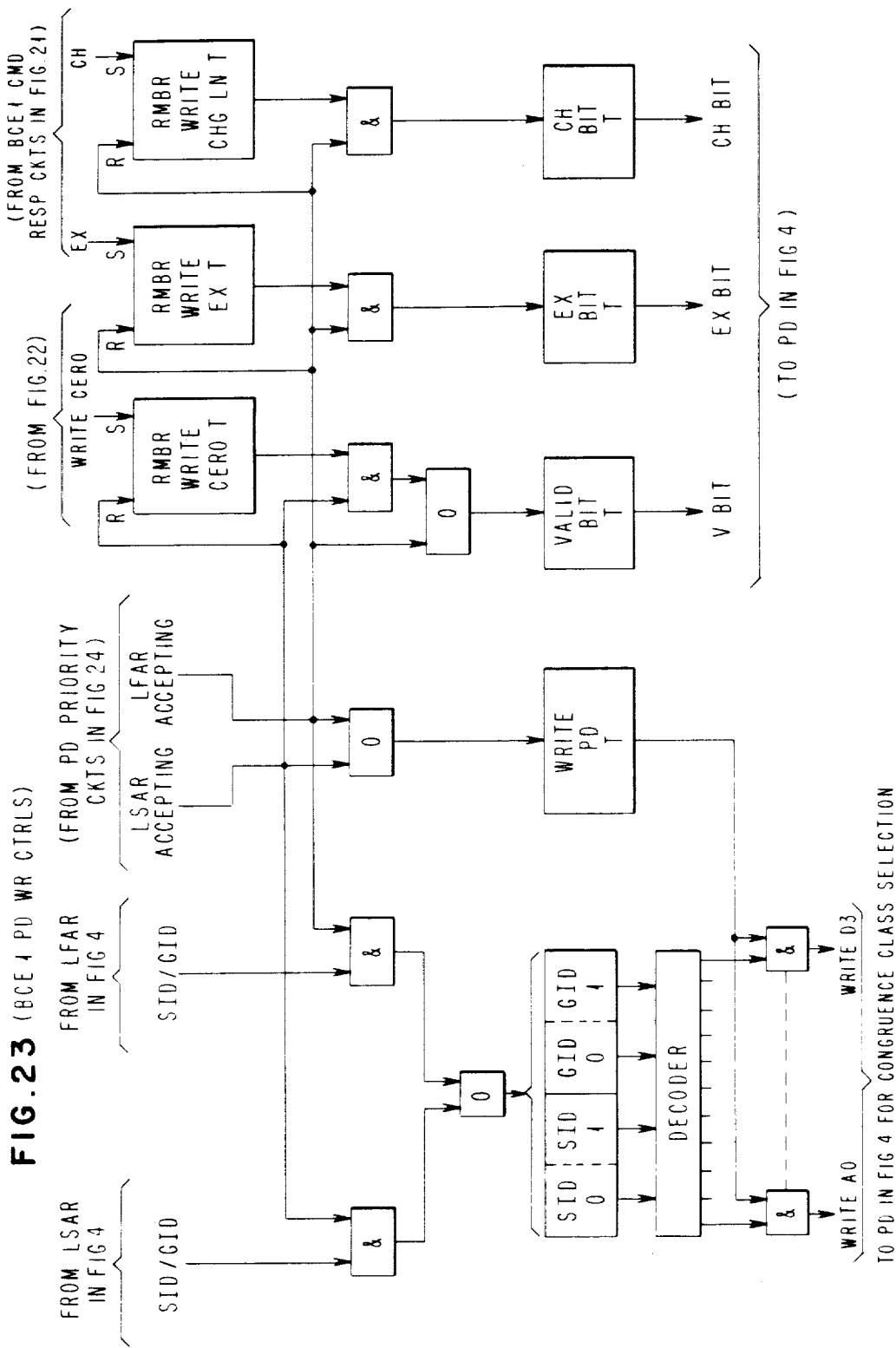
FIG. 23 illustrates the processor directory write controls in the BCE.
Figure 24:
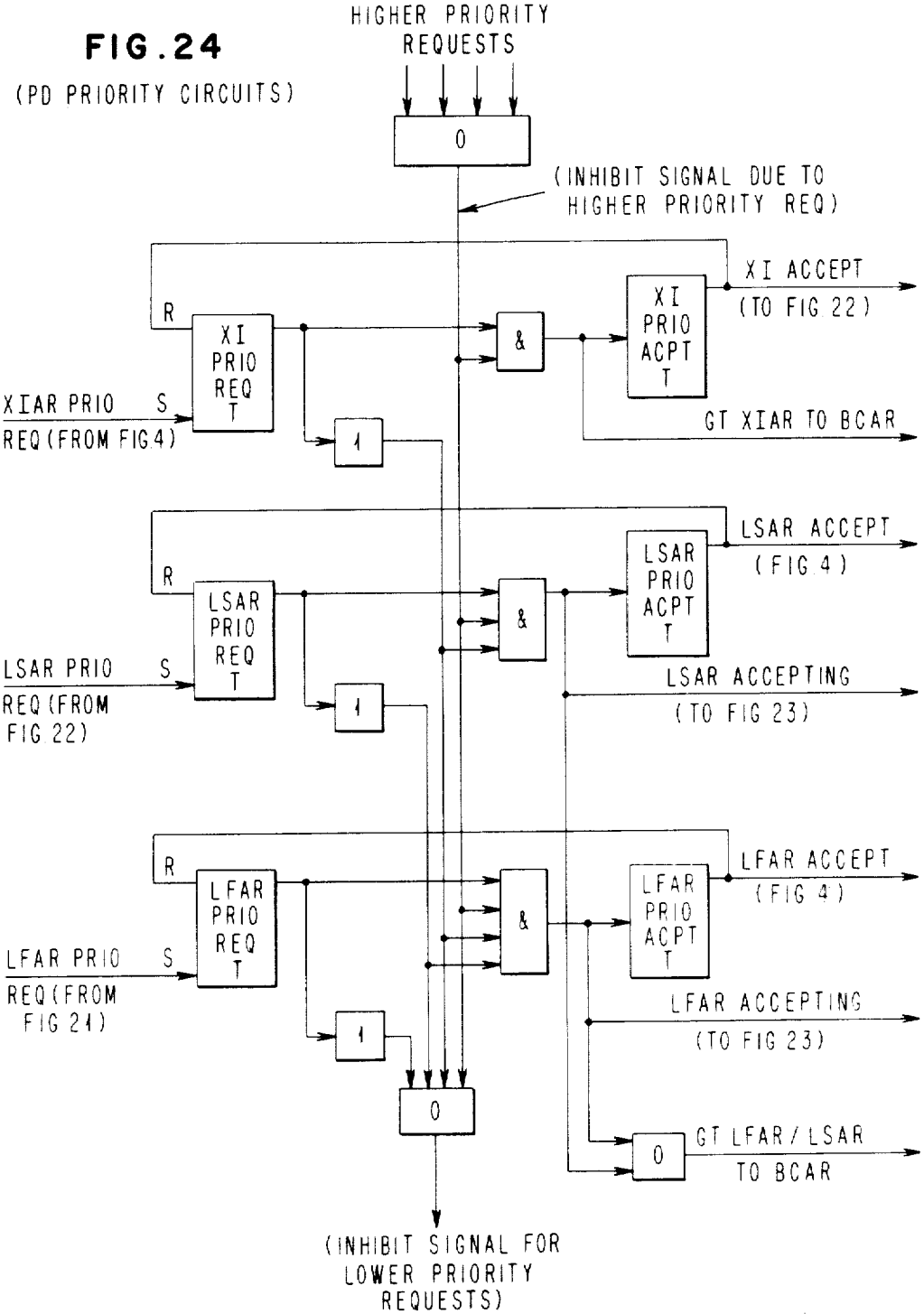
FIG. 24 illustrates the directory priority logic circuits in the BCE.

Also the addressed entry in PD 11 is updated at this time by the PD write controls 31, which are shown in detail in FIG. 23, which are actuated by the XIAR output to change the entry to RO or invalidate it. Also, if a castout is required by the XIH response controls 18, the XIH line address in the XIH entry being currently addressed in PD11 is set into LSAR 30 via the select circuits 26, and a start castout signal on a line 27 initiates castout controls 28 to activate an AND gate 63 to send the castout address of the requested DW from the LSAR 30 to the associated cache on address bus 14, which addresses the cache and causes the cache to output the line beginning at the requested DW at that address to a corresponding OBB in the local SCE.

Concurrently, the castout signal on line 27 is also provided to an AND gate 41 which is then conditioned to pass the castout address in LSAR 30 to a line 42 which merges with an output from the XI response bus 23 to provide the XIH response to the local SCE.

In SCE1 in FIG. 5C, a signal on line 23(1) from BCE1 is received by BCE1 XI response controls 66(1) which then activates OBB1 to receive the castout line (beginning with the requested DW) being provided from the BCE1 cache on BCE1 data bus 67(1) from the cache (also see FIG. 2). The details in the BCE1 XI response controls 66(1) are shown in FIG. 16. The circuits in the BCE2 XI response controls 66(2) are identical to the circuits in control 66(1), and OBB2 is identical to OBB1 in its circuit structure and is shown in detail in FIG. 18.

Figure 19:
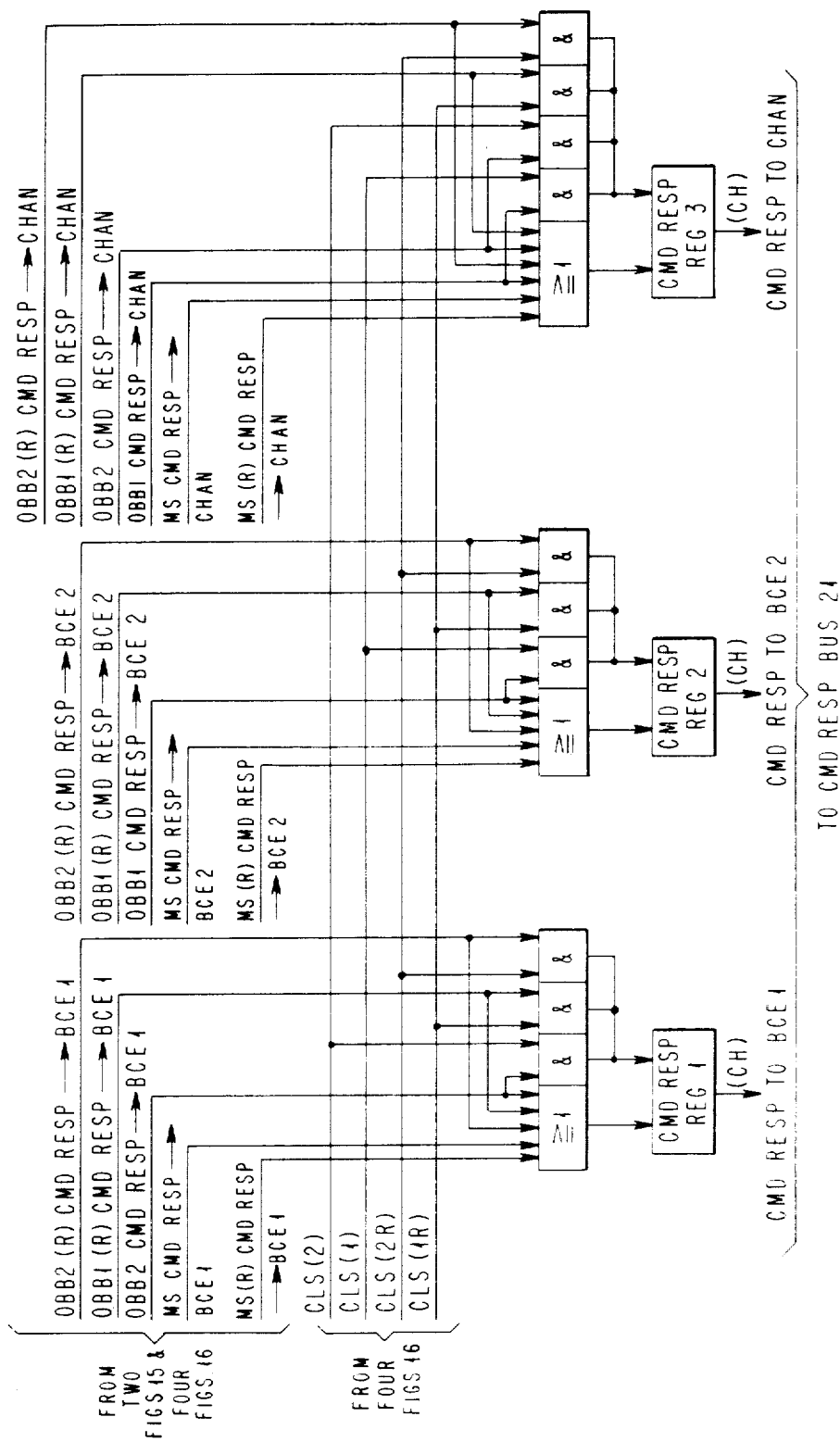
FIG. 19 illustrates the command response bus switch logic circuits in the SCE.
Figure 20:
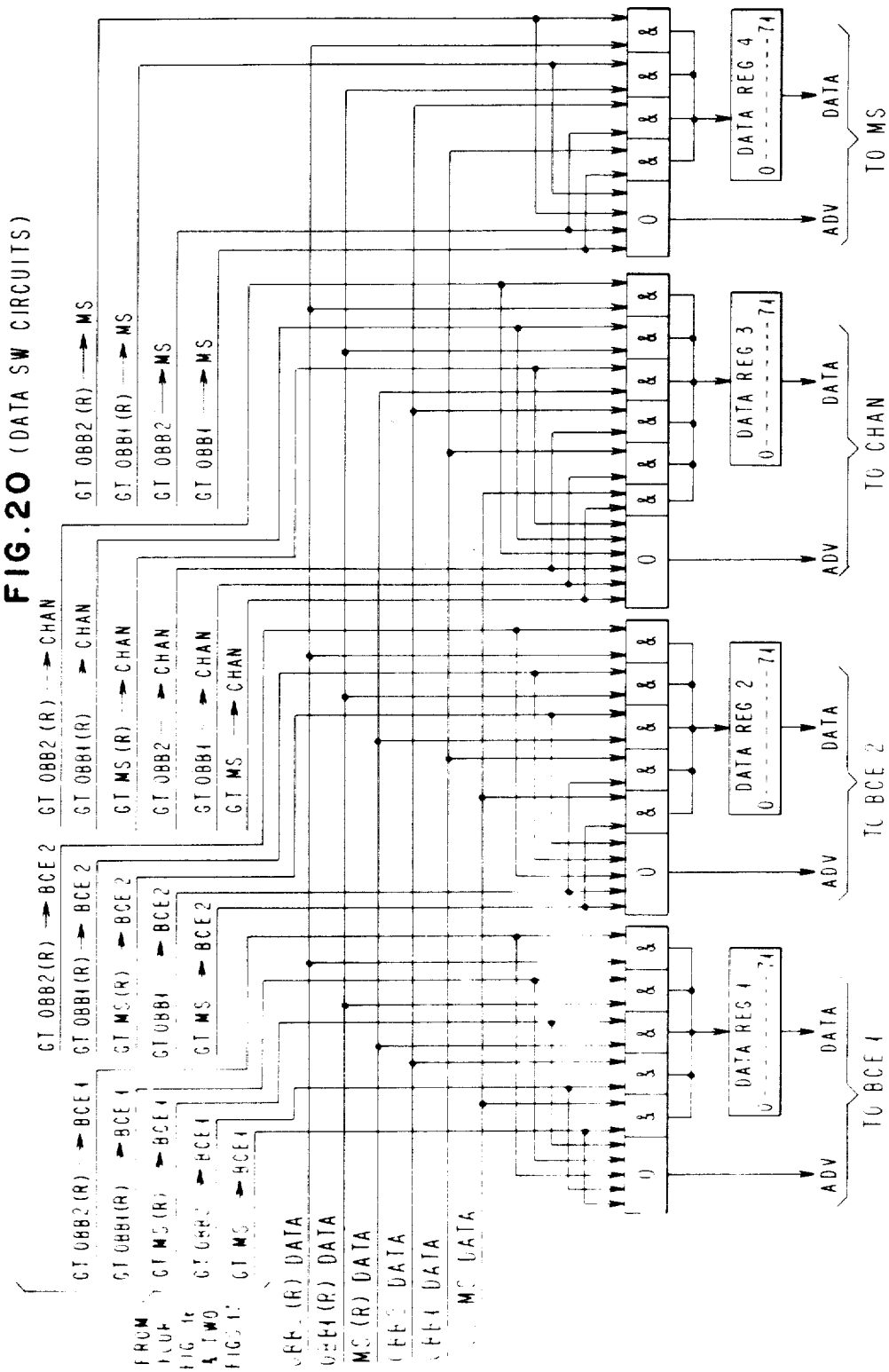
FIG. 20 illustrates the data switching logic in the SCE for cache-to-cache and cache-to-channel data transfers.

Another output line 71(1) from XI response controls 66 actuates command response bus controls (CRBC) 72 which has its internal circuits shown in detail in FIG. 19. CRBC 66 provide signals back to the requesting BCE (which is a different BCE than the BCE providing the XIH response and any castout). The form of the XI command response signals generated by CRBC 72 is shown in FIG. 10, in which one signal indicates that the XI response bus is active while the other signal CLS (changed line status) indicates whether the XIH data line being transmitted to the requesting BCE is changed (i.e. different from the copy of the line at the same MS address), which sets corresponding triggers in controls 19, which is shown in detail in FIG. 21. At the time of the related BCE fetch request, the requesting BCE stored in remembering (RMBR) triggers in FIG. 21 whether the requested line is to be designated EX or RO, and will control whether the PD entry for the received line is to have its change bit (CH) set or not (it cannot be set for an RO designation).

The PD write controls 31 (shown in detail in FIG. 23) receive the EX and CH outputs from the XI response controls 18 (see FIG. 22) and write these signals into corredponding flag fields in the PD entry for the current request.

The allocated entry in PD 11 determines where in the associated cache the line is to be stored as it is received from the sending OBB. The particular data bus for this OBB to cache transmission is selected by the XIH response controls 66(1) or 66(2) associated with the sending BCE, as shown in FIGS. 16A and 16B.

The XI response control 66(1) or 66(2) provides a control signal to either the local CRBC 72 on one of busses 71(1) or 71(2), or to the remote CRCB 72 in the remote SCE on one of the output signalling busses 76(1) or 76(2) shown in detail in FIGS. 16A and 16B. For example, a signal from control 66(1) to the remote SCE on bus 76(1) may activate either a gate OBB1-to-BCE1(R) line, or a gate OBB1-to-BCE2(R) line, or a gate OBB1-to-channel (R) line. The gate OBB1 signals on bus 71(1) may activate either a gate OBB1-to-OBB2 line, or a gate OBB1-to-channel (local).

If FIG. 5C activates bus 76(1) or 76(2) to signal it is providing a castout line to a remote requesting BCE, then the CRBC(R) in the remote SCE responds by signalling on a similar bus 76(1)R or 76(2)R to the CRBC 72 in the SCE local to the casting out BCE. For example, the remote BCE may provide a signal on bus 76(1)R which is on either a gate-OBB1(R)-to-BCE1 line or a gate OBB1(R)-to-BCE2 line. Similarly, bus 76(2)R may signal on either a gate OBB2(R)-to-BCE1 line, or a gate OBB2(R)-to-BCE2 line. CRBC(R) is comprised of the same circuits shown in detail in FIG. 16A or 16B with line labeling changed to the required connections.

The outputs from CRBC72 in FIG. 6 go from the SCE of the local BCE1, local BCE2, and the local channel processor to transmit SCE command response signals of the type in FIG. 10 to the requesting BCE or channel from circuits of the type illustrated in detail providing the command response outputs in FIG. 19 on the command response bus 21.

Figure 21:
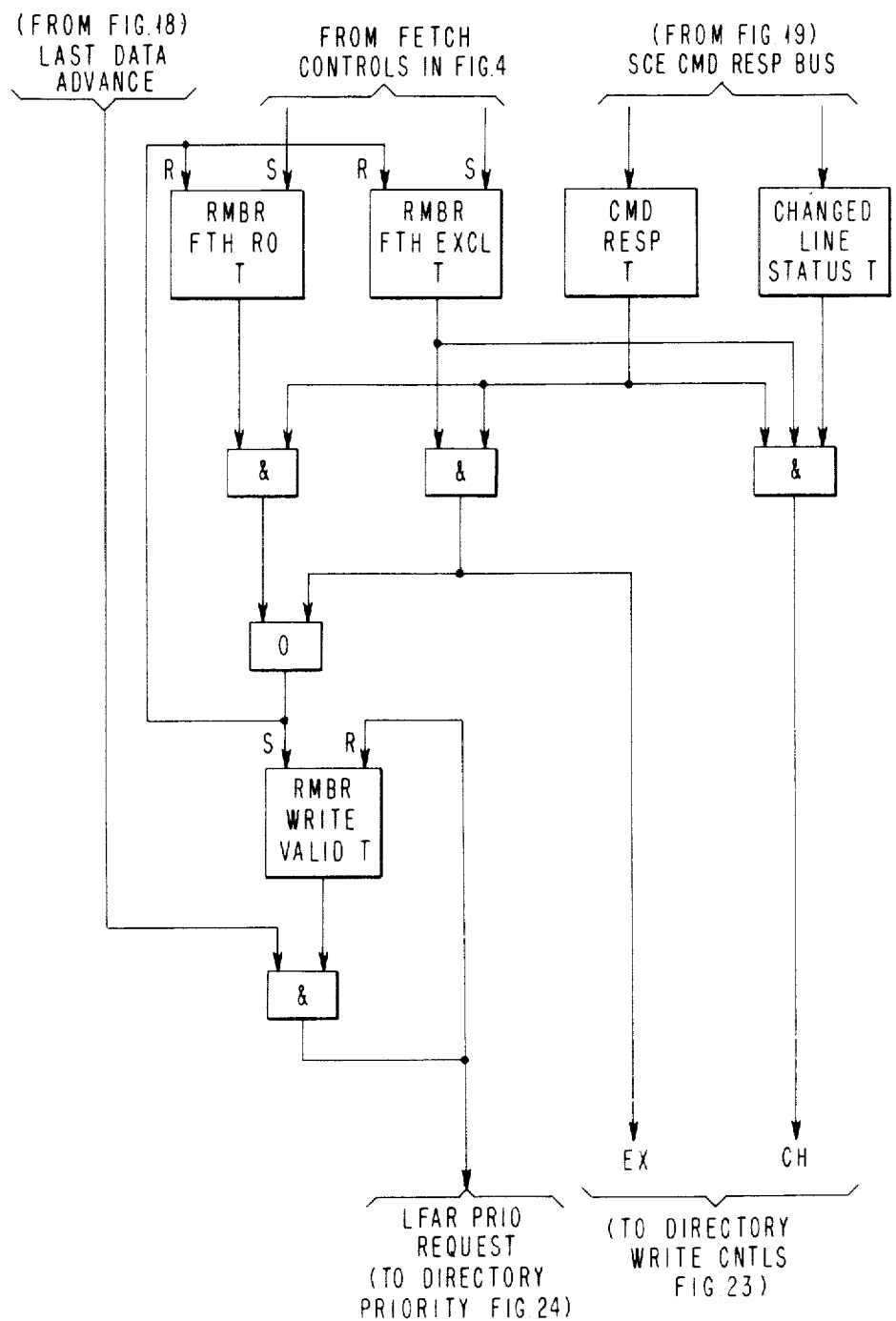
FIG. 21 illustrates the BCE command response control.

FIG. 4 illustrates the BCE connection of the command response bus 21 to command response controls 19 (which are shown in detail in FIG. 21). After it receives a signal from the SCE, command response controls 19 provide an output to the PD write controls 31 (shown in detail in FIG. 23) to cause writing to occur in the entry in PD 11 addressed by the current request in XIAR 17 currently in BCAR 12 by updating any or all of flag bits V, EX/RO and CH. The BCE operates in the manner similar to the BCE described in U.S. Pat. No. 4,317,168 previously cited.

Line 81(1) or 81(2) from controls 66(1) or 66(2) control the outputting of a line of castout data from a respective OBB to the requesting BCE which controls the inputting of the line into its associated cache. A line transfer from OBB1 is initiated by activation of output line 81(1) from controls 16 to cycle the OBB1 out-counter for 16 consecutive cycles to transfer 16 DWs from OBB1 to the data switching circuits 74 beginning with the requested DW using the switching controls, shown in detail in FIG. 20. Data switching circuits (DSC) 74 are a crosspoint switch which directs the received data to its local BCE1, BCE2, channel or MS section according to control signals received from the local CRBC 72.

In the embodiment of FIG. 2, each OBB not only has a data bus to its local DSC 74 but also has a similar data bus 86 to a remote DSC 74 in the remote SCE. If a local BCE or channel is to receive the data, then the data is transferred on either data bus 83(1) or 83(2) from OBB1 or OBB2 to the local DSC 74, which connects the data to the selected local BCE1, local BCE2, local channel or local MS section according to the current selection control outputs of local controls 66(1) or 66(2), respectively. However, if the data is to go to a remote BCE, remote channel, or remote MS section, then the data is transmitted on either SCE-to-SCE data bus 86(1) dedicated to BCE1 or SCE-to-SCE data bus 86(2) dedicated to BCE2 to the DSC 74, which will then transfer the data to remote BCE1(R), the remote BCE2(R), remote channel (R), or the remote MS section according to the current selection control outputs of local controls 66(1) or 66(2), respectively. Hence, the remote DSC 74 sets up the transfer data paths to a remote receiving cache or remote channel, so that the line of data is received and written in the requestor and the corresponding entry is written to the corresponding PD 11 when the requestor is a remote cache with the requested DW being received as the first DW of the received data line to allow the requesting CPU to have the requested data as soon as possible.

Another embodiment of the invention is shown in FIG. 25 in which flexible crosspoint switching containing non-dedicated busses is added to the interfaces of the subject matter previously described for FIGS. 5A, 5B and 5C, to provide cache-to-cache and cache-to-channel data transfers. The flexible crosspoint switching in FIG. 25 effectively replaces the data switching circuits 20 in FIG. 5C and its interconnection to a remote SCE.

Also this invention recognizes for the first time that the addition of crosspoint switching to the internal SCE and SCE-to-SCE data bussing, like that shown in FIG. 25, can be made to support a greater number of CPUs in an MP with pin limited LSI (large scale integration) circuit module technology. The subject inventors recognized that when an embodiment of the type shown in FIG. 2 is built from LSI modules with the maximum number of busses (determining the maximum number of CPUs supportable by a SCE), that there is an excess of circuits available in the LSI modules after all of the I/O pins of the SCE modules have been used for the control and data bussing. (Current LSI modules have a high circuit-to-pin ratio.) The inventors discovered that they could use these excess circuits for crosspoint switching internal to the modules to support the connection of more BCEs to an SCE without requiring more I/O pins on the modules, or more modules in an SCE. (The constraint of having a limited number of pins otherwise would have limited the size of the system configuration.) Hence, the addition of the crosspoint switching circuits used the excess circuits internal to a LSI module without requiring additional I/O pin support to allow each SCE to support more CPUs locally and remotely in an MP.

This I/O pin constraint may be explained by comparing the bussing in the different embodiments in FIGS. 2 and 25, in which each SCE has the same number of units (i.e. two BCEs, a MS section and an I/O channel processor) supporting two CPUs. In this comparison, there are twelve data busses (ignoring the channel busses) providing dedicated local and remote data bussing for each SCE in FIG. 2; while in FIG. 25 there are eight data busses (ignoring the channel busses) to the crosspoint switches in each SCE for supporting the same number of CPUs. Also in FIG. 25, no additional SCE-to-SCE bussing need be added to support each additional CPU (i.e. additional BCE); while in FIG. 2 an additional SCE-to-SCE data bus is required per additional BCE. This comparison shows that the dedicated bussing structure in FIG. 2 requires 50% more data busses per CPU than the crosspoint switched bussing structure in FIG. 25. Each data bus is assumed to have 72 lines for carrying one DW in parallel, which requires 72 I/O module pins for each bus connection in an SCE. Increasing the number of busses in an SCE causes a corresponding increase in the pin requirement. A LSI module pin count in an SCE sufficient to support two CPUs per SCE in FIG. 25, requires the dedicated bussing of 12 data busses. However, this pin count for 12 data busses may support three or four CPUs per SCE when using crosspoint switching of the type shown in FIG. 25 when the LSI modules used to construct the SCEs have a high circuit-to-pin ratio.

Although FIG. 25 illustrates two XPs per SCE, it is apparent that any number of XPs may be provided in each SCE. Preferably there is the same number of XPs in each SCP supporting a corresponding SCE-to-SCE bus connected between corresponding XPs in the two SCEs. Accordingly, the addition of each XP to each SCE adds the parallelism of another local bus connection and of another SCE-to-SCE bus connection. Thus, crosspoint switch XP1 in FIG. 25 connects to an input data bus and an output data bus of each unit in the set of units comprising OBB1, OBB2, CHAN1, MS section 1 and its remote SCE2. XP1 can connect any input data bus of the set to any output data bus of another unit in the same set. Also, XP1 can connect any input or output bus in the set to bidirectional data bus 101, which also connects to XP3 in SCE2 to enable any input or output bus in SCE1 to connect to any output or input bus of the set of units connecting to SCE2. Likewise, XP3 can connect any local input or output data bus to the output or input data bus of any other unit in the same set comprising OBB3, OBB4, CHAN2, MS section 2 and its remote SCE1 using bidirectional bus 101. (The CHAN1 and CHAN2 connections are not shown in FIG. 25 because the cache-to-channel transfers in this invention only output to channels.)

The labeling shown in FIG. 25 is different for each SCE set. However, this labeling could be made identical for both SCE1 and SCE2 by using the labeling in SCE1 also in SCE2, and then reference a unit or item of a remote SCE by subscripting its label with the symbol (R). The latter labeling leads to less problems in practice, although the former labeling (shown in FIG. 25) is easier for the reader to follow.

A second XP (i.e. XP2 or XP4) is shown in each SCE in FIG. 25 and connects in parallel to the same local inputs and outputs as XP1 or XP3 in SCE1 or SCE2, respectively. However, a different remote connection bus 102 is provided between XP2 and XP4. Thus, any local unit of XP1 (i.e. BCE1, BCE2, CHAN1, or MS1) can transfer data in either direction on bus 101 to any local unit of XP2 (i.e. BCE3, BCE4, CHAN2, or MS2), and visa-versa. Likewise XP2 and XP4 can simultaneously transfer data on bus 102 between any unit in SCE1 and any unit in SCE2. Or as another example, an inter-SCE transfer can be occurring using XP1, XP3 on bus 101 while a transfer between different local units in other or both of SCE1 and/or SCE2 can also be occurring using XP2 and/or XP4.

Hence a high degree of data bussing parallelism is provided by the four XPs in FIG. 25 among both internal units and external units, although the data bussing parallelism in the embodiment of FIG. 25 may not be greater than in the embodiment of FIG. 2.

Each of the SCE-to-SCE busses in FIG. 25 may be either half-duplex bidirectional, full-duplex bidirectional, or may be replaced by two unidirectional busses in opposite directions.

FIGS. 27A and 27B represent the internals of the crosspoint switching circuits XP1 and XP2 in SCE1. FIGS. 27A and 27B are also applicable to the crosspoint switching circuits XP3 and XP4 in SCE2 by changing the labeling on the illustrated lines and circuits.

FIGS. 27A and 27B control the crosspoint switching of one bit position (i.e. bit position 0) in each of XP1 and XP2, each connecting 72 bit positions of bussing comprising bit positions 0 through 71. Each of the 72 bit positions is similarly connected. XP1 has one in-select (I-S) circuit 111 and one out-select (O-S) circuit 121. XP2 likewise has one I-S circuit 211 and one O-S circuit 221. Each select circuit 111, 121, 211, 221 controls all 72 bit positions.

Each of the select circuits receives as inputs all of the gating outputs of all of the four BCE XIH response controls 66 (see FIG. 5C) in SCE1 and SCE2, as well as all of the outputs from the two MS response controls 69 (see FIG. 5C) in SCE1 and SCE2. The gating outputs of all FIGS. 16 and 17 in the MP represent the current data connections required in all crosspoint data switch pairs XP1, XP3 and XP2, XP4. The input and output connections interconnecting the two crosspoint switches in a pair are the inverse of each other. That is, in a data transfer from XP1 to XP3, the output of XP1 to bus 101 will be the input to XP3 from bus 101, and the input to XP1 will be the output of XP3.

Each crosspoint switch can make one bus connection at one time. Thus, each XP may be making a local bus connection so that the four XPs can be making four independent local bus connections in parallel. However, if a remote connection is required, the two XPs comprising a pair must be used together and both XPs in the pair must be available. A XP priority circuit 91 determines the priority between XP1 and XP2 in SCE1 for determining whether XP1 or XP2 is available for a local or remote connection. Thus circuit 91 receives the lines XP1 available, XP2 available, XP3 available and XP4 available to make a selection between XP1 and XP2 for a given data connection request. For a local input and output, a selection between XP1 or XP2 is made without regard to the availability of the remote XP in the pair. However, if a remote connection is being requested (i.e. requiring bus 101 or 102), then the availability of the remote XP in each pair is examined in circuit 91 before priority is allocated.

TABLE 3 represents the data connections which can be made by XP1 and XP2 for use by this invention. The two columns entitled "Sender to Requestor Signal"

represents the gate signals outputted from FIGS. 16 and 17. The four columns entitled "FIG. 27" represents the output signals from the select circuits 111, 121, 211 and 221 which control the data bussing AND gates within XP1 and XP2, respectively.

TABLE 3

|  |  | (FIG. 27) | | | |
|---|---|---|---|---|---|
| ALL FIGS. 16 & 17 GATE SIGNALS SENDER TO REQ | | XP1 111 I-S SIGNAL | XP1 121 O-S SIGNAL | XP2 211 I-S SIGNAL | XP2 221 O-S SIGNAL |
| OBB1 | BCE2 | OBB1 | BCE2 | — | — |
| OBB1 | BCE3 | OBB1 | BUS101 | BUS101 | BCE3 |
| OBB1 | BCE4 | OBB1 | BUS101 | BUS101 | BCE4 |
| OBB1 | MS1 | OBB1 | MS1 | — | — |
| OBB1 | MS2 | OBB1 | BUS101 | BUS101 | MS2 |
| OBB1 | CHAN1 | OBB1 | CHAN1 | — | — |
| OBB1 | CHAN2 | OBB1 | BUS101 | BUS101 | CHAN2 |
| OBB2 | BCE1 | OBB2 | BCE1 | — | — |
| OBB2 | BCE3 | OBB2 | BUS101 | BUS101 | BCE3 |
| OBB2 | BCE4 | OBB2 | BUS101 | BUS101 | BCE4 |
| OBB2 | MS1 | OBB2 | MS1 | — | — |
| OBB2 | MS2 | OBB2 | BUS101 | BUS101 | MS2 |
| OBB2 | CHAN1 | OBB2 | CHAN1 | — | — |
| OBB2 | CHAN2 | OBB2 | BUS101 | BUS101 | CHAN2 |
| MS1 | BCE1 | MS1 | BCE1 | — | — |
| MS1 | BCE2 | MS1 | BCE2 | — | — |
| MS1 | BCE3 | MS1 | BUS101 | BUS101 | BCE3 |
| MS1 | BCE4 | MS1 | BUS101 | BUS101 | BCE4 |
| OBB3 | BCE1 | OBB3 | BUS101 | BUS101 | BCE1 |
| OBB3 | BCE2 | OBB3 | BUS101 | BUS101 | BCE2 |
| OBB3 | BCE4 | OBB3 | BCE4 | — | — |
| OBB3 | MS1 | OBB3 | BUS101 | BUS101 | MS1 |
| OBB3 | MS2 | OBB3 | MS2 | — | — |
| OBB3 | CHAN1 | OBB3 | BUS101 | BUS101 | CHAN1 |
| OBB3 | CHAN2 | OBB3 | CHAN2 | — | — |
| OBB4 | BCE1 | OBB4 | BUS101 | BUS101 | BCE1 |
| OBB4 | BCE2 | OBB4 | BUS101 | BUS101 | BCE2 |
| OBB4 | BCE3 | OBB4 | BCE3 | — | — |
| OBB4 | MS1 | OBB4 | BUS101 | BUS101 | MS1 |
| OBB4 | MS1 | OBB4 | MS2 | — | — |
| OBB4 | CHAN1 | OBB4 | BUS101 | BUS101 | CHAN1 |
| OBB4 | CHAN2 | OBB4 | CHAN2 | — | — |

For example in TABLE 3, if FIG. 16 provides a signal "gate OBB1 to BCE3" to in-select (I-S) circuit 111 and out-select (O-S) circuit 121, circuit 111 will output "OBB1" and circuit 121 will output "bus 101", whereby XP1 will activate in-signal gate 131 and out-signal gate 144 to transfer the data line from OBB1 to SCE-to-SCE bus 101 beginning with the requested doubleword. Correspondingly XP3 is selected in the remote SCE2 with the inverse gates selected (corresponding to bus 101 I-S gate 134 and BCE1 O-S gate 141).

Figure 26:
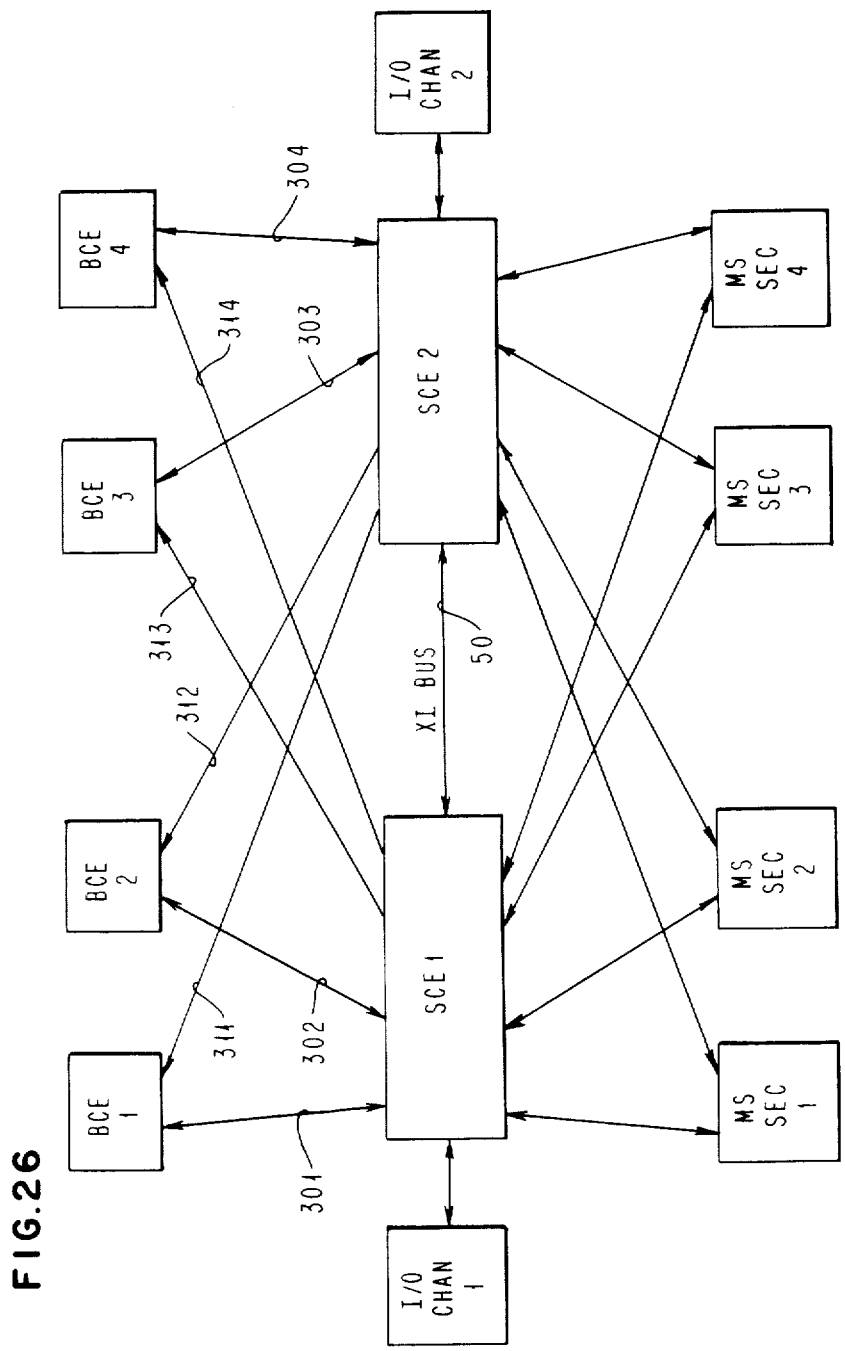
FIG. 26 is still another embodiment of the invention that operates according to TABLE 3 in the specification.

Still another type of embodiment of the invention is illustrated in FIG. 26, which is similar to the prior embodiment having a single SCE to support all cache-to-cache data transfers beginning with the requested doubleword. However, in FIG. 26 there are two SCEs, SCE1 and SCE2, in which each SCE primarily supports two BCEs for accessing all four MS sections 1–4 and a local channel processor. Thus, each SCE contains only the two CDs for the BCEs it primarily supports. To support cache-to-cache transfers in FIG. 26, each BCE is provided with two ports comprising a primary bidirectional port to its local SCE and a unidirectional secondary port from its remote SCE. The bidirectional ports are 301 and 302 to SCE1 and 303 to 304 in SCE2. The unidirectional ports are 311 to BCE1 and 312 to BCE2 from SCE2, and 313 to BCE3 and 314 to BCE4 from SCE1.

Therefore a data transfer from the cache in BCE1 to the cache in BCE4 is from bus 301 to bus 314 through switching in SCE1. All data busses connected to the same SCE are switched in the same manner as busses local to that BCE.

Thus, a data transfer from the cache in BCE1 to the cache in BCE2 (i.e. from bus 301 to 302) occurs in the same manner as previously described in the prior embodiments for a transfer between the caches local to any SCE, i.e. between the caches of BCE1 and BCE2 in FIG. 2. That is, in FIG. 26, the data bus switching for a cache-to-cache transfer always occurs in the SCE local to BCE(XIH), and each SCE has data switching circuits (like DSC 20 in FIG. 5C) which connect to all four BCEs instead of only to the two local BCEs shown in FIG. 5C.

The control signals in FIG. 26 operate somewhat differently from the other embodiment, in that a cache-to-cache transfer is only done when a cross-interrogation finds a XIH cache having a changed line (i.e. the XIH line has its CH flag on). Then the XIH cache sends the XIH line to the requesting cache via DRC 20 in the SCE local to the XIH cache, and then the XIH line is invalidated in the sending cache, i.e. BCE(XIH) and its CD(XIH), and is marked exclusive in the receiving cache directory, i.e. BCE(Q) and its CD(Q), regardless of whether the requesting IE requested the data exclusive or readonly.

In FIG. 26, there is no transfer to main storage of the XIH line in any cache-to-cache transfer, because the change (CH) and exclusive (EX) flags are set on for the XIH line in the receiving cache directory to represent a line of data different from the line with the same address in MS.

The embodiment of FIG. 26 requires a control communication protocol similar to that explained for FIGS. 3A or 3B, except that in FIG. 26 any resulting data transfer switching occurs within a SCE(XIH). The following TABLE 4 indicates the control protocol and data transfers for the embodiment in FIG. 26.

TABLE 4

| CACHE-TO-CACHE TRANSFER SUMMARY | | | | | | | |
|---|---|---|---|---|---|---|---|
| IE REQ Type | SCE XI SRCH | MS CNCL | CD Update | SCE SIGNAL to BCE(XIH) | BCE(XIH) RESP to SCE | SCE RESP to BCE(R) | DATA TRANSFER |
| Fetch RO | XI Miss | — | RO→D(Q) | — | — | — | MS→C(Q) |
|  | XIH RO | — | RO→D(Q) | — | — | — | MS→C(Q) |
|  | XIH EX | — | RO→D(Q) RO→D(XIH) | CERO if $\overline{CH}$ | — | $\overline{CH}$ | MS→C(Q) |
|  | XIH EX | CNCL | EX →D(Q) I→D(XIH) | CO & I if CH | CH | CH | X(XIH)→C(Q) |
| Fetch EX | XI Miss | — | EX→D(Q) | — | — | — | MX→C(Q) |

TABLE 4-continued

| | | | | CACHE-TO-CACHE TRANSFER SUMMARY | | | |
|---|---|---|---|---|---|---|---|
| IE REQ Type | SCE XI SRCH | MS CNCL | CD Update | SCE SIGNAL to BCE(XIH) | BCE(XIH) RESP to SCE | SCE RESP to BCE(R) | DATA TRANSFER |
| (Cache Miss) | XIH RO | — | EX→D(Q) I→D(XIH) | I | $\overline{CH}$ | $\overline{CH}$ | MS→C(Q) |
| | XIH EX | — | EX→D(Q) I→D(XIH) | I if $\overline{CH}$ | $\overline{CH}$ | $\overline{CH}$ | MS→C(Q) |
| | XIH EX | CNCL | EX→D(Q) I→D(XIH) | CO & I if CH | CH | CH | X(XIH)→C(Q) |

Thus, when for example BCE1 misses in its cache and sends a BCE request command on control bus 20 to SCE1, the XI control bus 58 receives the request and communicates to SCE2 so that the cross interrogation can be done in all four CD's 1–4. If for example, a XIH line is found in SCE2 for BCE4, then it is necessary for SCE2 to communicate the BCE1 request on the XIH bus 50 to the remote SCE (which may be the XIH SCE) so that it can determine if the XIH line has its CH flag on or off by communicating to BCE4 on the XIH request bus 22. The state of the CH flag is then communicated from BCE4 on the XIH response bus to SCE2, and then on the remote response control bus 76, 77 to SCE1 where the on state of the CH flag is communicated on the command response bus 21 back to the requesting BCE1. Then BCE1 knows that it is to receive a changed line of data exclusively from BCE4, and BCE1 sets the corresponding entry in its PD 11 with its EX bit on and its CH bit on. The resulting data transfer in FIG. 26 is done by a castout from BCE4 on data bus 304 to OBB4 in SCE2, then from OBB4 through the data switching circuits in SCE2 to the unidirectional data bus 311, which provides the line of data to BCE1 (beginning with the requested doubleword) into its associated cache.

Although this invention has been shown and described with respect to plural embodiments thereof, it should be understood by those skilled in the art that various changes and omissions in the form and details of the invention may be made therein without departing from the spirit and the scope of the invention.

Having thus described our invention, what we claim as new and desire to secure by Letters Patent is:

1. In a multiprocessor system (MP) having plural central processing units (CPUs), an I/O channel processor, and a shared main storage (MS), each CPU having a cache directory and cache for receiving and casting-out lines of data from and to MS on MS bussing means, any cache in the MP becoming a requesting cache when it does not contain a data line having a data unit requested by the associated CPU which is signalled as a missed request by cache directory controls, the MP comprising:

cross-interrogation (XI) means for receiving each CPU request missed in a requesting cache to search directories for all other caches in the MP for a data line containing the requested data unit, any other cache being found by the XI means to have a data line containing the requested data unit being designated as a XI hit line in a XIH cache, control communication means associated with the XI means for control signalling to the requesting cache when a XIH line is to be transferred from the XIH cache, data bussing means separate from the MS bussing means for transferring the XIH line of data from the XIH cache to the requesting cache without passing the data through MS or synchronizing the transfer with the availability of the MS bussing means, means for starting a data transfer on the data bussing means by first transferring the requested data unit and then transferring the remainder of the data line from the XIH cache to the requesting cache, whereby the requesting CPU can begin execution with the requested data unit before the cache-to-cache transfer of the data line is completed, the MS bussing means being available for an MS operation for a different data line during the cache-to-cache transfer of the data line on the data bussing means, whereby the cache-to-cache data transfer is not delayed by MS being busy with other requests.

2. In a MP as defined in claim 1, further comprising:

a plurality of output data buffers (OBBs), one OBB associated with each cache, means for copying the XIH line from the XIH cache into the associated OBB beginning with the requested data unit, the data bussing means transferring the XIH line from the OBB to the requesting cache beginning with the requested data unit, means for the XIH cache to be accessed by the associated CPU for other data lines simultaneously while the XIH line is being transferred from the associated OBB to the requesting cache on the data bussing means.

3. In a MP as defined in claim 1, further comprising:

an instruction element in each CPU in the MP for making requests for data exclusive to an associated cache directory which may miss and generate an exclusive missed request to the XI means, the XI means finding the XIH line changed in the XIH cache, the control communication means marking the received line changed and exclusive in the directory for the requesting cache, the data bussing means transferring the line to the requesting cache, no data transfer from or to MS occurring on the MS bussing means for the exclusive request for the XIH line.

4. In a MP as defined in claim 1, further comprising:

an instruction element in each CPU in the MP for making requests for readonly data to an associated cache directory which may miss and generate a readonly missed request to the XI means, the XI means detecting the state of a line changed (CH) flag field for a XIH line in the XIH cache, the data bussing means transferring the XIH line to the requesting cache, the control communication means marking the received line exclusive in the directory for the receiving cache and setting the CH flag field for the received line to the same state as the CH flag field detected by the XI means for the XIH line when the request is made, no data transfer from or to MS occurring for the XIH data line which is to be held exclusively in the requesting cache.

5. In a MP as defined in claim 1, further comprising:
an instruction element in each CPU in the MP for making requests for either exclusive (EX) or readonly (RO) data to an associated cache directory,
flag means with each cache directory in the MP for indicating the EX or RO state of each line of data being validly held in each associated cache,
means for generating a MS request for a line fetch in MS of a line of data containing the missed request at the time the XI means receives the missed request,
means for cancelling the MS request in response to the control communication means signalling that a XIH cache is found with an EX flag indicating the XIH line is exclusive,
whereby no data transfer from MS to the requesting cache occurs for the exclusive XIH line of data which is transferred from the XIH cache to the requesting cache, thereby freeing path resources from MS to the requesting cache.

6. In a MP as defined in claim 5, an instruction element causing an EX missed request, further comprising:
means for setting on the EX state in the flag means for the XIH line in the requesting cache directory,
means for invalidating the XIH line in the XIH cache directory,
whereby the transferred line is available exclusively in the requesting cache after the cache-to-cache transfer.

7. In a MP as defined in claim 2, further comprising:
flag means accompanying each entry in each cache directory in the MP for indicating an exclusive (EX) or readonly (RO) state and a changed (CH) or not changed state of each validly held line of data in the associated cache,
an instruction element making a RO request which missed in the associated cache which outputs a RO missed request to the XI means,
the CH flag means for the XIH line in the XIH cache being found by the XIH means to indicate the XIH line is changed and different from a corresponding line in MS with the same MS address,
means for transferring the XIH line on the data bussing means from the associated OBB to the requesting cache without regard to the availability of the MS bussing means,
the MS bussing means, when available, later transferring the XIH line to MS from the associated OBB for a RO request,
means for setting flag means in the requesting cache directory for the XIH line to RO state and not changed state to indicate the received line is now the same as the line in MS with the same address.

8. In a MP as defined in claim 7, further comprising:
XIH means for inhibiting the transferring means when line is flagged in the XIH cache as not changed and therefore is the same as the corresponding line in MS,
whereby the XIH line is transferred to the requesting cache but is not transferred to MS when the XIH line is flagged to be the same as the corresponding line of data in MS, regardless of whether the instruction unit request causes a RO or an EX missed request.

9. In a MP as defined in claim 8, further comprising:
the XI means including a copy directory (CD) for each cache directory in the MP,
flag means with each entry in each cache directory in the MP for indicating an exclusive (EX) or readonly (RO) state and a changed (CH) or not changed state of each line of data being validly held in each associated cache, each CD having a copy of the EX/RO flag means for each entry but not having any copy of any CH flag means,
an instruction element making an exclusive request which missed in the associated cache which outputs a EX missed request to the XI means,
the CH flag means for a XIH line found in the XIH cache directory indicating the XIH line is changed and different from a corresponding line in MS with the same MS address,
means for inhibiting the transferring means when the XIH line has the EX flag means on in the XIH CD to prevent a transfer of the line to MS,
whereby the XIH line is transferred by the data bussing means to the requesting cache but is not transferred to MS regardless of the state of the CH flag for the XIH line in the XIH cache directory when the EX flag is set on for the XIH line in the XIH CD for an EX missed request, and
whereby the XI means determines the action required by the XIH cache directory before the control communication means communicates with the XIH cache or XIH cache directory.

10. In a MP as defined in claim 8, further comprising:
MS cancelling means for cancelling an access request to MS, the MS cancelling means not being actuated by the XI means when the XI means finds an XIH cache directory that indicates the XIH line is not-changed and is in RO state,
the MS bussing means is actuated to fetch the MS requested line from MS to the requesting cache, whereby no cache-to-cache transfer occurs regardless of whether the instruction unit request cause a RO or an EX missed request.

11. In a MP as defined in claim 8, further comprising:
the MS cancelling means not being actuated when the XI means does not find any XIH line in any cache in the MP and has a XI miss,
whereby the MS requested line fetch is transferred from MS to the requesting cache and no cache-to-cache transfer occurs for the XI miss.

12. In a MP system as defined in claim 1, further comprising:
means for connecting I/O channel requests for MS data accesses to the XI means,
the communication control means signalling when a XIH line has been found by the XI means in a cache directory for an I/O channel request, and that the line is being transferred to the requesting channel,
the data bussing means transferring the data from the XIH cache to the requesting channel without passing the data through MS or synchronizing the transfer with the availability of MS.

13. In a MP as defined in claim 12, further comprising:
   a plurality of output data buffers (OBBs), one OBB associated with each cache,
   means for copying the XIH line from the XIH cache into the associated OBB in response to signalling from the communication control means,
   the data bussing means transferring the XIH line from the OBB to the requesting I/O channel in response to a signal that the XIH line is received by the associated OBB,
   whereby the XIH cache can be performing access operations independent of the XIH line while the XIH line is being transferred to the requesting channel from the associated OBB.

14. In a MP system as defined in claim 13, further comprising:
   means for transferring the XIH line from the associated OBB to MS whenever MS is available after the XIH line or any part of the line is transferred from the associated OBB to the requesting I/O channel,
   whereby the I/O channel can later obtain from MS any data in the XIH line not received by the I/O channel during the cache-to-channel transfer, so that the XIH cache is not again disturbed for the same line of data by any other channel request.

15. In a MP as defined in claim 1, in which the XI means further comprises:
   a copy directory (CD) corresponding to an associated CPU cache directory associated with each CPU,
   cache request command means for responding to a missed request in a CPU cache directory to signal the missed request to the XI means,
   command registering means (LFAR) for storing a miss request to the XI means,
   whereby the cache having a miss request registered in the command registering means is available for receiving other CPU requests while waiting for the requested line of data.

16. In a MP as defined in claim 15, in which the control communication means further comprises:
   XI search address registering means (XISAR) for receiving miss requests from each CPU cache directory, the XI means connecting the XISAR to each CD in the MP for searching each required CD for a miss request being provided by the XISAR, a found line being designated CD(XIH) and its associated CPU cache directory being designated SIC(XIH),
   XIH request signalling means for signalling from the CD(XIH) to controls for SIC(XIH) when a XIH line is found in the CD(XIH) that must be castout and/or invalidated, or changed-to-readonly state.

17. In a MP as defined in claim 16, the XI means further comprising:
   means for comparing addresses in each signalled CD with an address in XISAR, wherein the finding of an equal address in a CD identifies an XIH entry in a CD(XIH),
   means for testing flag fields in the XIH entry in CD(XIH), the flag fields including a valid (V) field and an exclusive/readonly (EX/RO) field,
   XIH request bus means being actuated by the comparing means finding an XIH line for requesting the cache controls for SIC(XIH) and the associated cache directory to castout and/or invalidate or change-to-readonly the XIH line in response to the request on the XIH request bus means.

18. In a MP as defined in claim 17, in which the control communication means further comprises:
   XIH response control means associated with the controls for each CPU cache directory in the MP for generating XIH response signals for indicating that the cache controls are complying with a XIH request received from the XIH request bus means.

19. In a MP as defined in claim 18, in which the control communication means further comprises:
   XIH command response control means for signalling to controls for the requesting cache whether the XIH line is changed in relation to a line in MS at the same address.

20. In a MP as defined in claim 19, in which the MP further comprises:
   data switching circuit means for connecting a data path from the XIH cache to the requesting cache in response to the response signals from the XIH response control means for SIC(XIH).

21. In a MP as defined in claim 20, the data path from the XIH cache further comprising:
   a data line buffer (OBB) connected to the output of the XIH cache for receiving the XIH line in response to the response signals for SIC(XIH),
   the data switching circuit means being connected between the output of the OBB for SIC(XIH) and an input bus to the requesting cache.

22. In a MP as defined in claim 21, in which the MP further comprises:
   a system control element (SCE) containing the XI means and CDs for all CPU caches in the MP, the XIH command response control means, the OBBs, and the data switching circuit means,
   the cache request command means being connected to SCE cache controls in the MP, and
   I/O channel request means being connected to the XI means in the SCE, and
   MS being connected to the SCE for providing data for MS requests not satisfied by a data transfer from a cache.

23. In a MP as defined in claim 21, in which the MP further comprises:
   a plurality of system control elements (SCEs) containing the XI means, each SCE being directly connected to cache controls (BCEs) for a subset of the CPUs in the MP, to a MS section, to an I/O channel processor, and to each other SCE in the MP,
   each SCE including a CD corresponding to a CPU cache directory in each BCE directly connected to the respective SCE, the XI means connecting each CD to a respective cache miss request command bus from each directly connected BCE, each SCE also including XIH request means, XIH command response control means, OBBs for receiving data from the directly connected BCEs, and data switching circuit means.

24. In a MP as defined in claims 21 or 22, the data switching means further comprising:
   crosspoint (XP) switching means in each SCE connected to the data outputs of the OBBs, the data input to each directly connected BCE, the input and output of the MS section, at least the input to the I/O channel processor, and inputs and outputs to each other SCE.

25. In a MP as defined in claim 24, the crosspoint switching means in each SCE further comprising:
dedicated bussing means providing parallel connections between inputs and outputs connected to the crosspoint switching means.

26. In a MP as defined in claim 25, the data switching means further comprising:
dedicated busses connected between the cross-point switching means in each SCE and in each other SCE in the MP to provide inter-SCE dedicated bussing.

27. In a MP as defined in claim 24, the data switching means further comprising:
assignable bus connection means in each crosspoint switching means for providing parallel connections between its inputs to outputs,
bus assignment priority means in each SCE for assigning bus connection means in each crosspoint switching means in the SCE, and the priority means receiving availability signals for each of the inputs and outputs connecting to each crosspoint switching means in the SCE.

28. In a MP as defined in claim 27, the crosspoint switching means in each SCE further comprising:
a plurality of crosspoint switches, each crosspoint switch connecting to all of the inputs and outputs of the crosspoint switching means,
each crosspoint switch enabling an independent bus connection in the SCE,
whereby plural crosspoint switches can sustain simultaneous parallel data transfers.

29. In a MP as defined in claim 28, the crosspoint switches further comprising:
LSI circuits internal to LSI modules,
whereby the crosspoint switches require minimal module I/O pin count, providing less than all possible simultaneous path connections in any SCE, to enable an increase in the number of CPUs supportable by each SCE in a MP.

30. In a MP as defined in claim 28, further comprising:
the priority means selecting an available input or output of a crosspoint switch in one SCE from or to another SCE for transferring data between SCEs,
a plurality of data busses connecting between the SCEs.

31. In a MP as defined in claim 30, the data busses connecting between SCEs further comprising:
plural half-duplex bidirectional data busses.

32. In a MP as defined in claim 30, the data busses connecting between SCEs further comprising:
plural full-duplex bidirectional data busses.

33. In a MP as defined in claim 30, the data busses connecting between SCEs further comprising:
each of plural data busses comprised of two unidirectional busses for opposite transmission directions.

34. In a MP as defined in claim 28, further comprising:
OBB outputs connected to the crosspoint switching means for outputting any OBB in consecutive machine cycles to a requesting cache or channel processor, regardless of whether the data in the OBB was received from a sending cache in consecutive machine cycles.

35. In a MP as defined in claim 34, further comprising:
means for simultaneously connecting plural OBBs to separate outputs to enable parallel data transmissions to and/or from the plural OBBs in the MP.

* * * * *